US012748716B2

(12) United States Patent
Yao et al.

(10) Patent No.: US 12,748,716 B2
(45) Date of Patent: Sep. 29, 2026

(54) MOTHERBOARD AND COMPUTING DEVICE

(71) Applicant: HUAWEI TECHNOLOGIES CO., LTD., Shenzhen (CN)

(72) Inventors: Yimin Yao, Shenzhen (CN); Cheng Huang, Shenzhen (CN); Yuanjun Niu, Xi'an (CN); Haiqiang Ju, Xi'an (CN); Yongguang Cheng, Shenzhen (CN); Ying Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 18/427,724

(22) Filed: Jan. 30, 2024

(65) Prior Publication Data

US 2024/0220439 A1 Jul. 4, 2024

Related U.S. Application Data

(63) Continuation of application No. PCT/CN2022/112634, filed on Aug. 16, 2022.

(30) Foreign Application Priority Data

Aug. 20, 2021 (CN) ......................... 202110961648.5
Dec. 29, 2021 (CN) ......................... 202111638881.6

(51) Int. Cl.
*G06F 13/40* (2006.01)
*G06F 1/26* (2006.01)

(52) U.S. Cl.
CPC .......... *G06F 13/4068* (2013.01); *G06F 1/266* (2013.01)

(58) Field of Classification Search
CPC .................................................. G05B 19/4183
See application file for complete search history.

(56) References Cited

U.S. PATENT DOCUMENTS 7,106,581 B2 * 9/2006 Olson .................. G06F 1/1601 361/679.48
10,795,846 B1 10/2020 Rathinasabapathi et al.
(Continued)

FOREIGN PATENT DOCUMENTS

CN 101359999 A 2/2009
CN 201845275 U 5/2011
(Continued)

OTHER PUBLICATIONS

Server/ProjectOlympus, Open Compute Project, Copyright 2018, URL: https://www.opencompute.org/wiki/Server/ProjectOlympus, total 5 pages.
(Continued)

*Primary Examiner* — Henry Tsai
*Assistant Examiner* — Juanito C Borromeo

(57) ABSTRACT

The motherboard includes a basic computing unit and an extension unit. The basic computing unit is provided with a basic component and an external interface. The extension unit is configured to extend a function of the basic computing unit. The basic computing unit is coupled to a second external interface of the extension unit through a first external interface on the basic computing unit. A conventional motherboard is split, and a basic computing unit that includes only a processor subsystem and an extension unit that extends input/output and management are formed by properly dividing the processor subsystem and a peripheral system. Impact of an extension component on the basic computing unit is reduced, and the extension component can be flexibly replaced based on an actual requirement.

18 Claims, 8 Drawing Sheets

1000

(56) References Cited

U.S. PATENT DOCUMENTS

| | | | | |
|---|---|---|---|---|
| 2009/0031062 | A1* | 1/2009 | Shen | G06F 13/409 710/100 |
| 2012/0084476 | A1 | 4/2012 | Li | |
| 2012/0262874 | A1* | 10/2012 | Sun | G06F 1/184 361/679.33 |
| 2013/0073768 | A1 | 3/2013 | Cong et al. | |
| 2014/0365196 | A1 | 12/2014 | Melander et al. | |
| 2015/0049422 | A1 | 2/2015 | Ji et al. | |
| 2016/0132454 | A1* | 5/2016 | Barga | G06F 13/4068 710/301 |
| 2018/0074984 | A1* | 3/2018 | Olarig | G06F 13/36 |
| 2020/0410815 | A1 | 12/2020 | Daranyi et al. | |

FOREIGN PATENT DOCUMENTS

| | | | | |
|---|---|---|---|---|
| CN | 206003169 | U | 3/2017 | |
| CN | 107463224 | A | 12/2017 | |
| CN | 107526665 | A | 12/2017 | |
| CN | 208848149 | U | 5/2019 | |
| EP | 4361759 | A1 * | 5/2024 | G06F 1/16 |

OTHER PUBLICATIONS

Priya Raghu et al, "Datacenter Secure Control Module Specification", Open Compute Project, Mar. 11, 2021, total 50 pages.

Rajeev Sharma, "Datacenter-ready Secure ControlModule (DC-SCM) and Interface(DC-SCI)", Oct. 23, 2019, total 46 pages.

Pc/104 Consortium: "PCI/104-Express (TM) and PCIe/104 (TM) Specification", URL:http://pc104.org/wp-contentuploads/2015/03/PCI104_Express_v3_0,Feb. 17, 2015,,XP093203510, total 73 pages.

Anonymous: "PC104 Consortium Home—PC/104 ConsortiumPC/104 Consortium", URL:https://pc104.org/,Sep. 10, 2024, XP093203516,total 3 pages.

Anonymous: "PCI Express—Wikipedia", URL:https://en.wikipedia.org/w/index.php? title=PCI_Expressandoldid=963103645, Jun. 17, 2020,XP055850600A,total 23 pages.

* cited by examiner

MOTHERBOARD AND COMPUTING DEVICE

CROSS-REFERENCE TO RELATED APPLICATIONS

This application is a continuation of International Application No. PCT/CN2022/112634, filed on Aug. 16, 2022, which claims priority to Chinese Patent Application No. 202110961648.5, filed on Aug. 20, 2021 and Chinese Patent Application No. 202111638881.6, filed on Dec. 29, 2021. All of the aforementioned patent applications are hereby incorporated by reference in their entireties.

TECHNICAL FIELD

This application relates to the field of computing device technologies, and in particular, to a motherboard and a computing device.

BACKGROUND

Since the 1980s, Microsoft and Intel have formed Wintel alliance to promote the development of a personal computer PC) industry. Two companies work closely in the PC industry to promote a Windows operating system to run on a PC that is based on an Intel central processing unit (CPU). The Wintel alliance promotes continuous improvement of computing capabilities (which may also be referred to as computing power) in a computing device such as the personal computer or a server, so that computing devices are gradually widely used in various industries, thereby promoting rapid development of a computing industry.

With increasing application scenarios and configuration types of the computing device, computing power of hardware in the computing device is diversified. This poses higher requirements on cross-architecture component sharing, cross-generation evolution, shortened time to market (TTM), and reduced costs of the computing device. However, a design of a motherboard (motherboard) of a conventional computing device such as the personal computer or the server depends on a constraint of a CPU, and units such as a memory module, a hard disk, a peripheral component interconnect express (PCIe) card, and a fan in the computing device are usually produced by different manufacturers. Units of different manufacturers or different models need to be designed with different motherboards to meet a requirement for adaptation between the CPU and the units. This causes problems such as a high design difficulty, a long time-to-market period, and poor compatibility of the motherboard. Therefore, how to provide a more general motherboard becomes an urgent technical problem that needs to be resolved.

SUMMARY

This application provides a motherboard and a computing device using the motherboard, so that a motherboard development period is reduced on the basis of reducing a motherboard design difficulty by optimizing a motherboard architecture design, and compatibility of the motherboard can be improved.

According to a first aspect, this application provides a motherboard, including a basic computing unit and an extension unit. The basic computing unit is provided with a basic component and a first external interface, where the basic component includes a processor and a main memory; and the extension unit is configured to extend a function of the basic computing unit, where the basic computing unit is coupled to a second external interface of the extension unit through the first external interface, to implement a function of a conventional motherboard.

It can be learned from the foregoing description that, based on a degree of standardization of a component in a conventional motherboard, a component-based motherboard architecture design solution is proposed, to achieve a simplified and standardized design of the basic computing unit. In addition, the basic computing unit is not affected by a circuit of an extension component, thereby implementing decoupling between the basic computing unit and the extension component, reducing impact of the extension component on the basic computing unit, and flexibly replacing the extension component according to an actual requirement. In addition, functional units such as input/output (I/O) units of different manufacturers can be flexibly combined with the basic computing unit or the basic computing unit through the extension unit. In this way, a commercial motherboard may be quickly provided based on a service requirement, and the development period and development costs of the motherboard may be reduced.

In a possible embodiment, the computing device further includes an extension component, configured to extend a function of the computing device. The extension component includes a functional unit, where the functional unit includes an I/O unit, a storage unit, an acceleration unit, and a memory expansion unit. The I/O unit is configured to implement communication between the computing device and a component or device outside the computing device, and extend an I/O capability of the computing device. The storage unit is configured to extend a storage capability of the computing device. The acceleration unit is configured to provide a system acceleration component expansion and interconnection function. The memory expansion unit is configured to provide a system memory bandwidth expansion function and a system memory capacity expansion function.

In another possible embodiment, there may be one or more extension units.

In another possible implementation, the first external interface includes a management interface and a data interface, where the management interface is configured to implement transmission of a control signal between the basic computing unit and the extension unit, and the data interface is configured to implement data interaction between the basic component and the extension component. In this way, management and control between units and between components and data interaction of corresponding functions are implemented.

In another possible implementation, the data interface includes at least one of interfaces that support functions of a peripheral component interconnect express PCIe, a compute express link CXL, a unified bus UB, a Huawei cache coherence system HCCS, a serial attached small computer system SAS, and a serial advanced technology attachment SATA. Different types of interfaces may be used to extend a data transmission mode between the basic computing unit and the extension unit or the functional unit, thereby satisfying different service requirements.

In another possible implementation, the extension component is connected to the data interface, to implement data transmission between the basic component and the extension component. The extension component may be connected to the basic computing unit through a data interface of the basic computing unit, to expand a management function, an I/O capability, and a storage capability of the basic computing unit.

In another possible implementation, the extension component is disposed on the extension unit, and the extension unit is connected to the data interface, to implement data transmission between the basic component and the extension component. When the extension component is disposed on the extension unit in a manner of insertion or the like, the extension component may further perform data transmission through an external connection interface between the extension unit and the basic computing unit, and may also implement an objective of extending a management function, an I/O capability, and a storage capability of the basic computing unit.

In another possible implementation, the first external interface of the basic computing unit further includes a first power supply interface, where the first power supply interface is configured to supply power based on a power supply requirement of the basic component and/or the extension component. The basic computing unit may be connected to a power supply unit through the first power supply interface, to supply power to the basic component or the extension component. The basic computing unit may further supply power to the extension component on the extension unit in an inter-board transfer manner, to implement unified allocation and management of power supply resources, thereby properly controlling energy consumption efficiency.

In another possible implementation, the power supply requirement includes a voltage requirement or a power consumption requirement.

In another possible implementation, the first power supply interface is connected to a power supply unit through a cable. In other words, the power supply unit may be connected to the basic computing unit through the cable, to implement a power supply function.

In another possible implementation, the basic computing unit is configured to have a plurality of board body sizes, and one board body size in the plurality of board body sizes is set based on a quantity of configured processors and/or a quantity of configured main memories. In this way, for function configurations in different application scenarios, a physical size of the basic computing unit may be determined based on a quantity and a size of components configured on the basic computing unit, and the component-based motherboard architecture design is used to satisfy a corresponding service requirement.

In another possible implementation, a mounting hole is provided on the basic computing unit, to adapt to a fixing structure on a chassis of the computing device. Further, the fixing structure on the chassis is divided into at least one group of fixing structures based on a position relationship, and one group of fixing structures in the at least one group of fixing structures may be adaptable to basic computing units of different board body sizes. That is, in comparison with a division rule of the fixing structure on the chassis, the basic computing unit that satisfies different functional configurations can adapt to one group of fixing structures, and have good adaptability and operability. Therefore, on one hand, flexible assembly and installation between the basic computing unit and a server chassis may be facilitated, and assembly and overhaul and maintenance operations may be easily performed. In addition, a standard installation interface form is applied. During specific application, different basic computing units may be replaced and installed based on an installation fixing structure of a same server chassis, for example, but is not limited to basic computing units of different CPU models, different CPU architectures (ARM/X86), or different CPU manufacturers (Intel/AMD/Phytium/Kunpeng), and basic computing units of different basic computing unit manufacturers, which can satisfy differentiated customer scenarios and application requirements.

In another possible implementation, the second external interface includes a second power supply interface, and when the extension component includes a component whose power supply requirement is less than a first threshold, the second power supply interface is configured to be connected to the first power supply interface in an inter-board transfer power supply manner, to supply power to the extension component. In this way, on one hand, power demands of a basic component with relatively high power consumption on the basic computing unit can be satisfied. In addition, in an application scenario in which power consumption of the extension component on the extension unit is relatively small, the basic computing unit may divide voltage based on a requirement of the component, and establish the inter-board transfer power supply manner by using the second power supply interface and the first power supply interface, to supply power to the extension component, and a power distribution manner is more reasonable.

In another possible implementation, the extension unit further includes at least one of a power supply unit interface, a heat dissipation unit interface, and a chassis panel control interface, where the power supply unit interface is configured to be connected to the power supply unit through the cable, the heat dissipation unit interface is configured to transmit a heat dissipation control signal of the extension component, and the chassis panel control interface is configured to transmit a control signal of a chassis panel.

In another possible implementation, the second external interface includes a second power supply interface, and when the extension component includes a component whose power supply requirement is greater than or equal to a second threshold, the second power supply interface is directly connected to the power supply unit through a cable, to supply power to the extension component in a direct power supply manner. In other words, the extension unit in this solution may supply power by directly connecting the cable to the power supply unit, and may be applied to an application scenario in which power consumption of the extension component on the extension unit is relatively large.

In another possible implementation, the first threshold may be the same as the second threshold.

In another possible implementation, the first threshold is different from the second threshold.

In another possible implementation, the extension unit is further provided with a baseboard management controller configured to identify and configure the functional unit. In this way, functions of device identification and monitoring and management in the computing device are implemented.

In another possible implementation, the basic computing unit is further provided with a baseboard management controller configured to identify and configure the functional unit.

In another possible implementation, the baseboard management controller may be set as a baseboard management controller card, and the baseboard management controller card is connected to the extension unit through a slot, to quickly implement connection and removal between the baseboard management controller and the basic computing unit. When the baseboard management controller is faulty, the baseboard management controller may be separately removed, to implement quick operation and maintenance management.

In another possible implementation, a management object template is preset in the baseboard management controller, and hardware self-description information corresponding to the management object template is preset in the functional unit; and the baseboard management controller is configured to obtain the hardware self-description information of the functional unit, generate a management object instance based on the management object template and the hardware self-description information, and identify the management object instance. In this way, the manufacturer of the functional unit is not limited to the architecture, version, or model of the CPU, and only needs to comply with a standard definition of the external interface on the basic computing unit and configure corresponding hardware self-description information based on the standard definition of the hardware self-description information, the BMC can automatically discover and configure the functional unit. In this way, after the basic computing unit is decoupled from the functional unit, the manufacturer of the functional unit has greater design and production flexibility, which can promote development and progress of the manufacturer of the functional unit such as the I/O unit. In addition, monitoring and management is performed on the functional unit through the management object instance, where the monitoring and management includes at least one of temperature control and validity check.

In another possible implementation, the baseboard management controller may be configured with a unit discovery module and a template parsing module, where the unit discovery module is configured to obtain hardware self-description information stored in the functional unit, to identify a corresponding functional unit; and the template parsing module is configured to parse the hardware self-description information, and generate the management object instance based on the management object template.

In another possible implementation, the hardware self-description information includes hardware basic information, management topology information, management component information, and monitoring alarm information. The hardware basic information is for identifying corresponding functional hardware or basic computing unit, for example, but is not limited to attribute categories such as a specification version, a unit type, a unit identifier, a unit manufacturer, and various version numbers that facilitate automatic identification and adaptation. The management topology information is for creating a management topology of the functional unit, for example, but is not limited to categories such as a temperature sensor, a voltage sensor, and a connector. The management component information is for identifying an attribute of the functional unit, for example, but is not limited to attribute categories such as a component type, a component manufacturer model, a product line number, and other necessary information. The monitoring alarm information is for monitoring a working status of the functional unit, and is for indicating whether the functional unit runs normally, for example, but is not limited to attribute categories such as a sensor type, a sensor subtype, a sensor monitoring object, a monitoring frequency, a current count of a sensor, an alarm value, an alarm threshold, and other necessary information.

In another possible implementation, the baseboard management controller may be further configured with a unit monitoring module, configured to monitor and manage the corresponding functional unit.

In another possible implementation, the hardware self-description information further includes heat dissipation information, where the heat dissipation information includes a temperature control threshold.

For example, the management object instance includes the recommended target temperature and the maximum threshold temperature. A temperature sensor that collects a real-time temperature of the management object instance may be determined by a temperature sensor in the hardware self-description information, and an adaptive heat dissipation control is completed based on the recommended target temperature and the maximum threshold temperature in the hardware self-description information. It can flexibly adapt to different functional units. For a new functional unit or component, adaptive heat dissipation management may be implemented, and intelligent heat dissipation management may be implemented without re-testing or upgrading temperature management software.

In another possible implementation, the baseboard management controller is further configured to monitor a status of the functional unit based on the hardware self-description information, to ensure running reliability of the computing device.

In another possible implementation, the extension unit and/or the functional unit includes field replaceable unit description information. The baseboard management controller obtains layer-1 management topology information of the extension unit and/or the functional unit by reading the field replaceable unit description information, and establishes a component management topology based on the layer-1 management topology information; and extends a management port of the baseboard management controller based on the component management topology, thereby improving management efficiency.

In another possible implementation, the field replaceable unit description information includes an identifier of an extension unit or a functional unit, and the basic computing unit includes a computing device compatibility list. The baseboard management controller is further configured to read the field replaceable unit description information and the computing device compatibility list, and determine, based on the field replaceable unit description information and the computing device compatibility list, whether the extension unit or the functional unit is allowed to be connected to the computing device.

For example, the validity of a board may be determined based on a serial number of the board or another information that uniquely identifies the board. When it is detected that an identifier of the newly connected board satisfies a numbering rule or another checking mode, the newly connected board may be determined as a valid board; and when it is detected that the identifier of the newly connected board does not satisfy the numbering rule or another checking mode, the newly connected board may be determined as an invalid board, so as to effectively avoid invalid addition of the board. For example, but is not limited to: a quantity of boards is limited to an unreasonable increase, and a board provided by a non-compliant manufacturer is limited.

In another possible implementation, the field replaceable unit description information includes a sensor identifier used to monitor an ambient temperature of the functional unit. The baseboard management controller is further configured to generate the management object instance based on the sensor identifier, the heat dissipation information in the hardware self-description information, and the management object template.

In another possible implementation, the field replaceable unit description information is written with a slot number corresponding to the extension unit or the functional unit, and a management correspondence table between a name of the extension unit or the functional unit and the slot number is set in the baseboard management controller.

According to a second aspect, this application further provides a computing device. The computing device includes a motherboard, and the motherboard described above is used as the motherboard, to implement a corresponding function or connection relationship. The computing device may be different computing scenarios of an application motherboard, for example, but is not limited to a computer, a server, an edge device, and the like.

According to a third aspect, this application further provides a basic computing unit. The basic computing unit is provided with a basic component and a first external interface, where the basic component includes a processor and a main memory, and the basic computing unit is coupled to a second external interface of an extension unit through the first external interface. The basic computing unit is configured to implement a corresponding function in any one of the first aspect or the possible implementations of the first aspect.

In a possible implementation, the first external interface includes a management interface and a data interface, where the management interface is configured to implement transmission of a control signal between the basic computing unit and the extension unit, and the data interface is configured to implement data interaction between the basic component and the extension component.

In another possible implementation, the first external interface of the basic computing unit further includes a first power supply interface, where the first power supply interface is configured to supply power based on a voltage requirement of the basic component and/or the extension component. For example, but is not limited to, the basic computing unit may perform conversion between a direct current or an alternating current through a power conversion circuit, and perform voltage division to supply power to a corresponding component based on a requirement of a component in the basic computing unit, so that energy consumption efficiency is properly controlled. For example, the first power supply interface is connected to the power supply unit through the cable. In other words, the power supply unit may be connected to the basic computing unit through the cable, to implement a power supply function.

In another possible implementation, the basic computing unit is configured to have a plurality of board body sizes, and one board body size in the plurality of board body sizes is set based on a quantity of configured processors and/or a quantity of configured main memories. In this way, for function configurations in different application scenarios, a physical size of the basic computing unit may be determined based on a quantity and a size of components configured on the basic computing unit, and the component-based motherboard architecture design is used to satisfy a corresponding service requirement.

In another possible implementation, a mounting hole is provided on the basic computing unit, to adapt to a fixing structure on a chassis of the computing device. Further, the fixing structure on the chassis is divided into at least one group of fixing structures based on a position relationship, and one group of fixing structures in the at least one group of fixing structures may be adaptable to basic computing units of different board body sizes. Therefore, on one hand, flexible assembly and installation between the basic computing unit and the server chassis may be facilitated, and assembly and overhaul and maintenance operations may be easily performed. In addition, a standard installation interface form is applied, which can satisfy differentiated customer scenarios and application requirements.

According to a fourth aspect, this application further provides an adaptation method for a motherboard unit, including the following steps: presetting a management object template on a baseboard management controller, and presetting hardware self-description information corresponding to the management object template on a functional unit; acquiring hardware self-description information of the functional unit connected to a motherboard; and generating a management object instance based on the hardware self-description information and the corresponding management object template, and identifying and configuring the functional unit by running the management object instance.

In a possible implementation, the hardware self-description information further includes heat dissipation information, where the heat dissipation information includes a temperature control threshold. The baseboard management controller generates the management object instance based on the heat dissipation information by using the management object template, and implements temperature management on the functional unit by running the management object instance.

In another possible implementation, the functional unit is further provided with field replaceable unit description information. The baseboard management controller obtains layer-1 management topology information of the functional unit by reading the field replaceable unit description information, establishes a component management topology based on the layer-1 management topology information; and extends a management port of the baseboard management controller based on the component management topology.

In another possible implementation, an identifier corresponding to the functional unit is written in the field replaceable unit description information, motherboard configuration information is provided on the motherboard, and the baseboard management controller determines, based on a comparison result of the read field replaceable unit description information and the motherboard configuration information, whether the functional unit is valid, where the motherboard configuration information includes the identifier.

In another possible implementation, the field replaceable unit description information specifies a sensor identifier used by the functional unit to perform ambient temperature monitoring, and the baseboard management controller generates the management object instance based on the sensor identifier by using the heat dissipation information and the management object template.

In another possible implementation, the field replaceable unit description information is written with a slot number corresponding to the extension unit or the functional unit, and a management correspondence table between a name of the extension unit or the functional unit and the slot number is set in the baseboard management controller.

According to a fifth aspect, a baseboard management controller is provided. The baseboard management controller includes a processor, and the processor is configured to implement functions implemented in any one of the foregoing aspects or the possible implementations of the foregoing aspects.

According to a sixth aspect, a baseboard management controller is provided. The baseboard management controller includes modules configured to perform the adaptation method in any one of the foregoing aspects or the possible implementations of any one of the foregoing aspects.

According to a seventh aspect, a chip is provided. The chip includes modules for performing the adaptation method in any one of the foregoing aspects or the possible implementations of any one of the foregoing aspects.

According to an eighth aspect, this application provides a computer-readable storage medium. The computer-readable storage medium stores instructions, and when the computer-readable storage medium is run on a computer, the computer is enabled to perform the method in the foregoing aspects.

According to a ninth aspect, this application provides a computer program product including instructions. When the computer program product is run on a computer, the computer is enabled to perform the method in the foregoing aspects.

In this application, based on implementations according to the foregoing aspects, the implementations may be further combined to provide more implementations.

DESCRIPTION OF EMBODIMENTS

Figure 1:
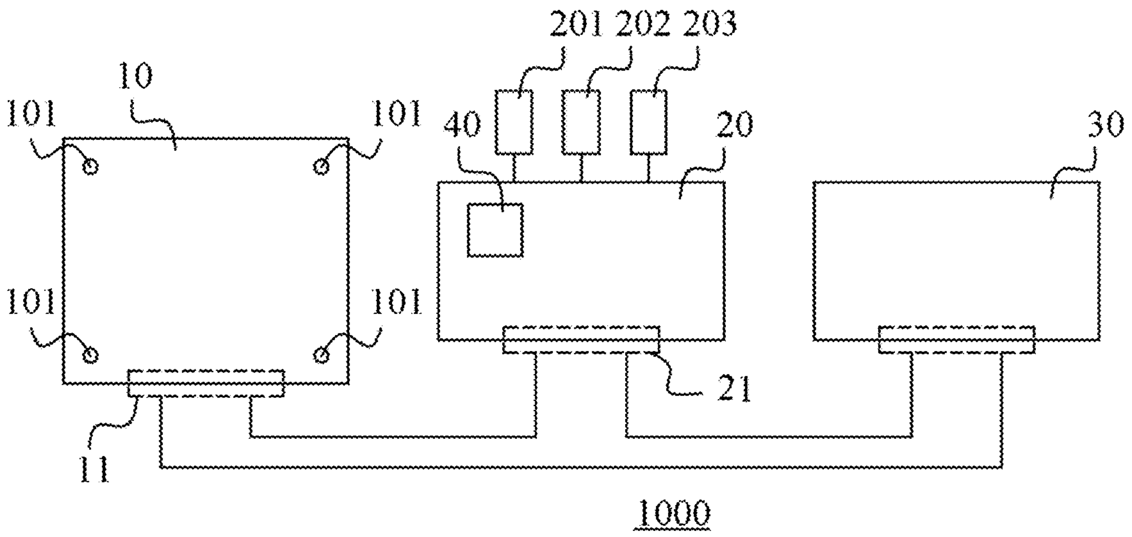
FIG. 1 is a schematic structural diagram of a motherboard according to this application.

For ease of description, terms in this application are first explained as follows.

A computing device is an electronic device configured to implement data processing and device management and control, for example, a computer, a server, or an edge device.

A basic component is a component included in a minimum system configured to provide a general computing capability, for example, a central processing unit (CPU) and a main memory (main memory).

An extension component is a component configured to extend a function of a basic computing unit, and the extension component may also be referred to as a functional unit. The functional unit further includes a component that implements an extended function of the computing device, such as an input/output unit (I/O unit or IOU), a storage unit (STU), an acceleration unit (ACU), or a memory expansion unit (memory expansion unit, MEU).

The I/O unit is configured to implement communication between the computing device and a component or a device outside the computing device, and extend an I/O capability of the computing device. The I/O unit includes a component such as Riser, to expand a system I/O of the computing device. The I/O unit supports a PCIe card (also referred to as a standard PCIe card) and an open compute project (OCP) card. Optionally, the I/O unit further includes an input/output device such as a network card, a graphics card, a redundant array of independent disks (RAID) card, a keyboard, a mouse, a scanner, a camera, a display, and a printer.

The storage unit is configured to extend a storage capability of the computing device. For example, the storage unit includes a function configured to implement a file or data storage of the computing device, for example, a hard disk drive.

The acceleration unit is configured to provide a system acceleration component expansion and interconnection function. Including Riser, a carrier board, an accelerator card interconnect switch (switch), a service driven infrastructure (SDI) card, an accelerator card, and a system on chip (SoC) card.

The memory expansion unit is configured to provide a system memory bandwidth expansion function and a system memory capacity expansion function, including a carrier board, a memory expansion chip, a storage class memory (SCM), a dual in-line memory module (DIMM), and the like.

Optionally, the extension component may be further configured to implement a control and management function in the computing device. For example, the extension component further includes a chassis panel control unit. Specifically, a component that is disposed in an independent form (for example, a board) of a chassis panel control circuit is referred to as the chassis panel control unit.

It should be noted that, in a specific implementation, based on a difference of a processing speed of the functional unit, a functional unit that needs to perform high-speed data transmission, such as a hard disk drive and a graphics processing unit (GPU) (which may also be referred to as a graphics card), may also be referred to as a high-speed functional unit, and a functional unit that needs to perform low-speed data transmission of an I/O interface circuit may be referred to as a low-speed functional unit.

The processor includes any one or any combination of a CPU, an application-specific integrated circuit (ASIC), a programmable logic device (PLD), a complex programmable logic device (CPLD), a field-programmable gate array (FPGA), a generic array logic (GAL), a system on chip (SoC), a software-defined infrastructure (SDI) chip, an artificial intelligence (AI) chip, and the like.

A heat dissipation unit is configured to dissipate heat for the computing device or hardware in the computing device, and includes a combination of several heat dissipation manners such as air cooling heat dissipation, liquid cooling heat dissipation, or a combination of the two. The heat dissipation unit may be controlled by the processor, a baseboard management controller (BMC), or a controller of another type, to implement a heat dissipation function for the basic component or the extension component in the computing device. In addition, it should be understood that a structure, a type, and a quantity of the heat dissipation unit do not constitute a limitation on the technical solutions to be protected in this application.

Aboard refers to a printed circuit board (PCB) with a ferrule, and may be connected to the computing device through a slot to control running of hardware, such as a graphics card and an acquisition card. After a driver is installed, a corresponding hardware function can be implemented, or a data transmission or another function can be implemented.

The following describes in detail a motherboard architecture provided in this application with reference to the accompanying drawings.

To resolve problems such as a high design difficulty, a long time-to-market period, and poor compatibility of a conventional server motherboard, this application provides a motherboard architecture of a brand-new component-based design, to split a conventional integrated motherboard into a plurality of daughter boards based on a degree of standardization of a component on the motherboard. A component that can be standardized in a conventional motherboard is disposed in a daughter board, and the daughter board may also be referred to as a basic computing unit (BCU). A component for managing and extending the basic computing unit is disposed in another daughter board, and the daughter board may also be referred to as an extension unit (EXU). The extension unit is configured to extend a management function of the basic computing unit, and is used as a management center of an entire system to provide management functions such as device, security, energy efficiency, and reliability. The basic computing unit and the extension unit are separately coupled through their respective external interfaces, to implement inter-board connection. The external interfaces are further used for data communication between the basic computing unit or the extension unit and the extension component such as the I/O unit, the storage unit, the acceleration unit, or the memory expansion unit. Therefore, when a requirement such as a processor needs to be updated or a computing power of a processor needs to be expanded occurs, only the basic computing unit needs to be replaced or improved, and the extension unit does not need to be redesigned or replaced, thereby reducing design difficulty and improving compatibility of the extension unit.

The component that can be standardized may be divided based on a minimum system that can provide a general computing capability. For example, the processor and the main memory may provide the general computing capability, and may be disposed on the basic computing unit. The extension component such as another I/O unit or the storage unit may be connected to the computing device through the external interface of the extension unit or the basic computing unit, thereby decoupling association between the processor and another component in the conventional motherboard. Optionally, the degree of standardization of the component may be divided based on a degree of association with startup of the computing device, or may be divided based on a minimum system that can be run by the computing device.

It should be noted that the conventional motherboard may be split into one basic computing unit and one extension unit, or may be one basic computing unit and a plurality of extension units. For ease of description, the following embodiments are described by using one basic computing unit and one extension unit as an example.

The following uses an example in which the computing device is a server and the processor in the server is a CPU for description. In addition, a connection manner between the extension component and the basic computing unit or the extension unit may be flexibly combined based on a service requirement. For ease of description, the following embodiments use an example in which the extension component is the I/O unit and the storage unit for description.

FIG. 1 is a schematic structural diagram of a motherboard according to this application. As shown in the figure, the motherboard 1000 includes a basic computing unit 10 and an extension unit 20. The basic computing unit 10 is provided with a basic component and a first external interface 11 that are necessary for starting the server. The extension unit 20 is provided with an extension component that does not affect startup of the server and a second external interface 21. The basic computing unit 10 is coupled to the second external interface 21 of the extension unit 20 through the first external interface 11. The extension component is configured to extend a function of the basic computing unit. The basic component and the extension component may be separately connected to the basic computing unit 10 or the extension unit 20 through the slot based on hardware attributes of the component, or may be separately connected to the basic computing unit 10 or the extension unit 20 through a board form, or may be separately connected to the basic computing unit 10 or the extension unit 20 through a pin (pin) or in an integrated form. The hardware attributes include hardware-related parameters such as a type, a model, a performance parameter, and a supported communication interface.

Figure 3:
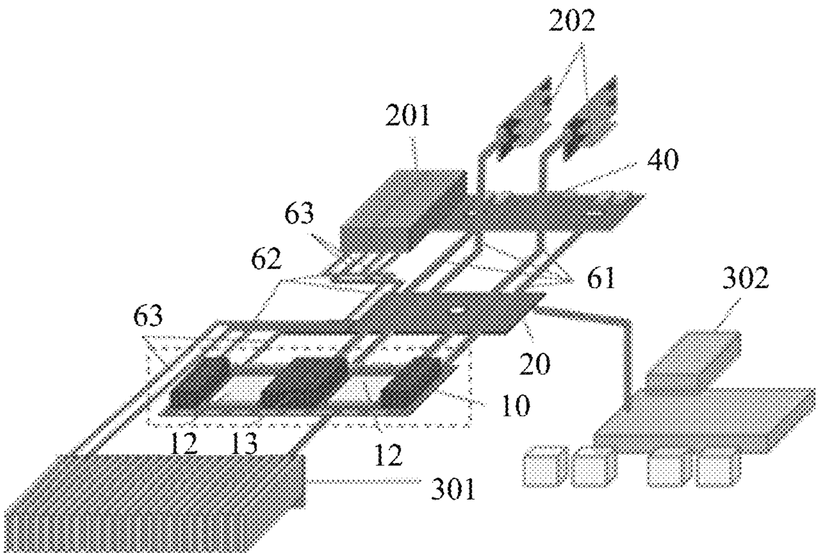
FIG. 3 is a schematic structural diagram of connections between an extension unit and a basic computing unit and between each functional unit and the basic computing unit according to this application.

Further, a baseboard management controller 40 may be disposed on the extension unit 20. The baseboard management controller 40 is configured to implement a configuration of automatic identification and monitoring and management of hardware in the computing device, and communicate with the basic component in the basic computing unit 10, to implement data interaction in the computing device. FIG. 3 is a schematic structural diagram of connections between an extension unit and a basic computing unit and between each functional unit and the basic computing unit according to this application. As shown in the figure, the baseboard management controller 40 may be in a form of a PCIe plug-in card, and is inserted and disposed on the extension unit 20. A line 61 shows a high-speed interface, a line 62 and a line 63 show a power supply interface, and a management interface and a low-speed interface are not shown in the figure. Optionally, the baseboard management controller 40 may also be connected to the extension unit 20 by using a pin, in an integrated manner, or in another manner.

Optionally, the extension unit 20 may be further provided with an auxiliary chip of the processor. For example, when an Intel (Intel©) processor is disposed in the basic computing unit 10, a bridge chip adapted to the processor may be disposed in the extension unit 20.

In a conventional motherboard architecture, extension components of the motherboard, such as an I/O interface circuit and a chassis panel control circuit, are also integrated on the motherboard to form an integrated motherboard. During the development of the motherboard, compatibility between a CPU architecture and the main memory needs to be considered. In addition, compatibility between the extension component, such as the I/O interface circuit, the chassis panel control circuit, and the CPU and main memory needs to be considered. On the one hand, due to limitations on different architectures and generations of CPUs. In addition, the extension component is also affected by the architectures and generations of the CPUs, which results in high difficulty in motherboard development and design, and the development costs and development period of the motherboard cannot be effectively controlled. In addition, a large quantity of hardware is integrated on an integrated motherboard, which also causes relatively high manufacturing costs of the motherboard of a conventional architecture. In addition, for a server, a problem that server motherboards of different forms cannot be shared, and design costs and manufacturing costs cannot be properly controlled is relatively obvious.

Compared with the conventional motherboard, the basic computing unit 10 disclosed in this application is configured with only the basic component that can be standardized by the server, and constitutes an extremely simplified computing unit. The design and development of the basic computing unit 10 do not need to pay attention to impact of the CPU on the I/O unit, the storage unit, the chassis panel control unit, and the like, and the development focuses on performance and matching compatibility of the basic component such as the CPU and the main memory that are required for server startup. On one hand, the development of the basic computing unit is simplified, and on the other hand, the manufacturer of the functional unit such as the I/O unit and the storage unit does not need to consider the impact of the CPU, so that the development of the functional unit is simplified, thereby forming a mode in which the basic computing unit and the functional unit are independently developed, and changing the architecture, design mode, and development mode of the conventional integrated motherboard.

Figure 2:
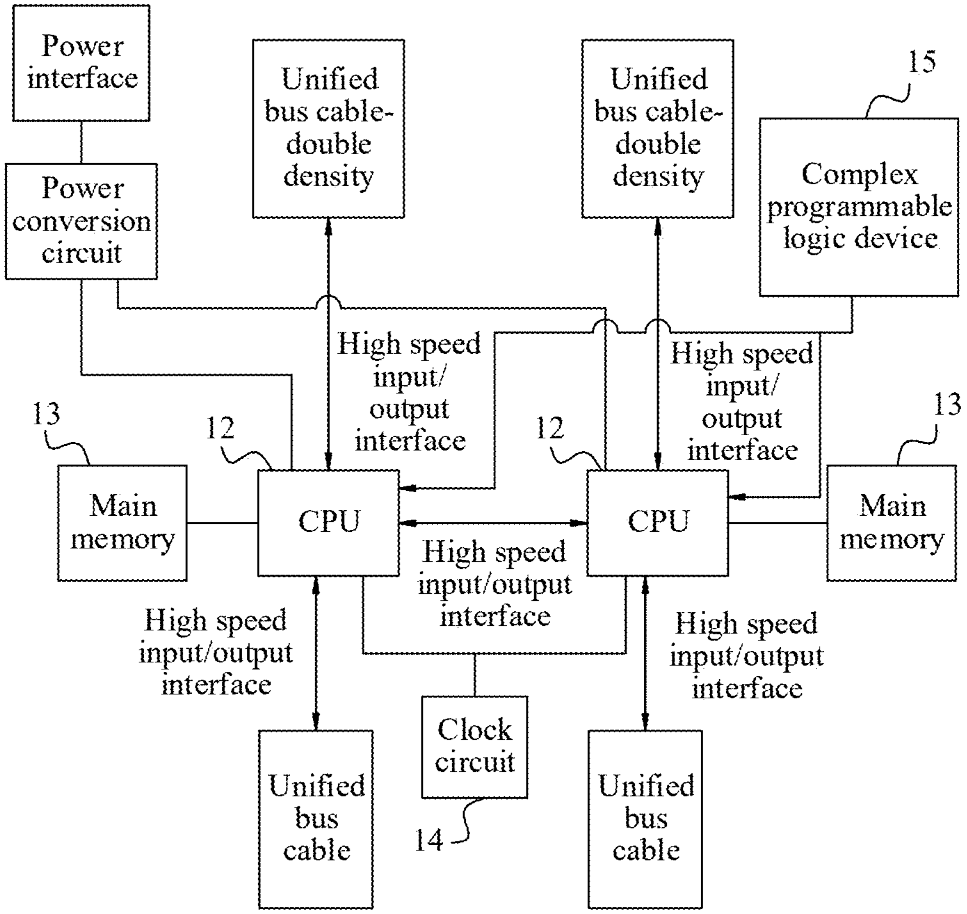
FIG. 2 is a structural block diagram of a basic computing unit according to this application.

With reference to FIG. 2, the following describes in detail a schematic structural diagram of a basic computing unit according to this application.

One or more CPUs may be disposed on different servers based on a set service requirement to satisfy different computing power requirements. In a new motherboard architecture provided in this application, one or more CPUs and different quantities of main memory slots may be disposed on a single basic computing unit. As shown in the figure, two CPUs 12 are configured on the basic computing unit. The two CPUs 12 may be coupled through a high speed input/output (high speed input/output) interface, as well as between any CPU 12 and hardware outside the basic computing unit 10. Each CPU 12 matches a corresponding quantity of main memory 13 slots based on a requirement. Each CPU is further separately connected to a plurality of unified bus cables (UBC) (which may also be referred to as unified bus connectors) or unified bus connectors-double density (UBC-DD) (which may also be referred to as unified bus connectors-double density) through the high speed input/output interface. The unified bus cable or the unified bus connector-double density may be separately coupled to the extension component such as the I/O unit or the storage unit. In addition, the processor may further be flexibly configured to be in a bus interface form such as a peripheral component interconnect express (PCIe), a compute express link (CXL), or a unified bus (UB or Ubus) supported by the processor, to implement communication and data transmission between components of the basic computing unit and between components of the basic computing unit and the extension component such as the I/O unit or the storage unit based on the high speed input/output interface. The high speed input/output interface includes a high speed serial port (Hisport). Optionally, the high speed input/output interface further includes at least one of a Huawei cache coherence system (HCCS) bus (configured to implement high speed interconnection between a plurality of processors (for example, an artificial intelligence processor) and support a cache coherence function between a plurality of chips), a serial attached small computer system interface (SAS) bus, a serial advanced technology attachment (SATA) bus, and other bus interfaces that can be used for connecting components, to implement connection and data transmission between components on the basic computing unit and between components on the basic computing unit and extension components.

Optionally, to satisfy a data processing requirement of the basic component of a type such as the CPU, a clock circuit 14 and a complex programmable logic device 15 (CPLD) may be further configured on the basic computing unit 10, where the CPLD may be connected to the CPU through a management input/output (management input/output) bus of the basic computing unit 10, to transmit a management signal or a management instruction between the CPLD and the CPU.

Optionally, at least one of components such as a basic input/output system (BIOS) and a flash memory (FLASH) may be further configured on the basic computing unit.

In addition, with reference to FIG. 1 and FIG. 3, the first external interface 11 on the basic computing unit 10 includes a data interface (not shown in the figure) and a management interface (not shown in the figure). The data interface is configured to perform data interaction, and includes a high speed interface and a low speed interface. The high speed interface is configured to implement data transmission between the component such as the CPU in the basic computing unit 10 and the functional unit by using a high speed transmission protocol. For example, the CPU in the basic computing unit 10 and the storage unit 1 (for example, a hard disk) perform high speed data interaction by using a PCIe bus protocol. The low speed interface is configured to implement data transmission between the component such as the CPU in the basic computing unit 10 and the functional unit by using a low speed transmission protocol. For example, the CPU in the basic computing unit 10 and the storage unit 301 perform low speed data interaction by using a SAS bus protocol. The management interface is configured to implement transmission of a control-type signal between the component such as the CPU in the basic computing unit 10 and hardware such as a chassis panel controller unit 203 and the baseboard management controller. For example, the CPU may transmit a control signal to the functional unit such as the chassis panel control unit 203 and a heat dissipation unit 302 through the management interface. The data interface may implement data transmission through at least one of a peripheral component interconnect express PCIe, a compute express link CXL, a unified bus UB, a Huawei cache coherence system HCCS, a serial attached small computer system interface SAS, and a serial advanced technology attachment SATA.

Further, to implement power supply of the motherboard architecture shown in FIG. 1, the basic computing unit may be connected to power (which may also be referred to as a power module or a power unit or a power supply module or a power supply unit) through an external interface, and the external interface includes a power supply interface. The basic computing unit may supply power to the basic component and/or the extension component through the power supply interface. For ease of description, an external interface of the basic computing unit may be referred to as the first external interface, and the power supply interface configured to supply power to the component of the basic computing unit is referred to as a first power supply interface. An external interface of the extension unit is referred to as the second external interface, and a power supply interface configured to supply power to the component of the extension unit is referred to as a second power supply interface.

Specifically, the first power supply interface may be connected to a power converter, to convert an input power provided by the power into a voltage required for running the basic component. Optionally, the first power supply interface may also provide a required voltage for a functional unit connected to the basic computing unit.

The following further describes a connection relationship between the basic computing unit and the extension unit by using FIG. 3 as an example. FIG. 3 is a schematic diagram of a connection between an extension unit 20 and a basic computing unit 10 according to this application. Refer to FIG. 1 and FIG. 3, two CPUs 12 and a main memory 13 are configured on the basic computing unit 10, and the extension unit 20 and the basic computing unit 10 are coupled to each other through a first external interface (not shown in the figure) on the basic computing unit 10 and a second external interface (not shown in the figure) on the extension unit 20. The power supply unit 201 is connected to the basic computing unit 10. The first external interface 11 further includes the first power supply interface, configured to be connected to the power supply unit 201 to obtain the input power, and supplies power to each unit based on a power supply requirement of the basic component in the basic computing unit 10 and the extension unit 20.

It should be noted that the power supply requirement may be represented in a plurality of forms. For example, parameters such as a voltage and power consumption may all be used to identify the power supply requirement of the component. For ease of description, in the following embodiments, an example in which the power supply requirement is a voltage requirement is used for description.

In actual application, each component has different voltage requirements (for example, 100 volts or 10 volts), and a voltage provided by the power supply unit 201 is a fixed value (for example, 220 volts). Directly allocating the voltage provided by the power supply unit to the component may cause the component to be damaged because a power supply voltage is excessively large, or cause the component to fail to work because a power supply voltage is excessively small. Therefore, the power supply unit 201 needs to supply power to different hardware based on a voltage requirement of a component or a link unit disposed in the basic computing unit or the extension unit.

In a possible embodiment, the power supply unit 201 may supply power to the component in the basic computing unit or the extension unit through any one of a cable direct-connection power supply manner or an inter-board transfer power supply manner.

Manner 1: When the voltage requirement of the component is less than or equal to a first threshold, the power supply unit 201 is connected to the basic computing unit 10 or the extension unit 20 in the inter-board transfer power supply manner.

Manner 2: When the voltage requirement of the component is greater than or equal to a second threshold, the power supply unit 201 is connected to the basic computing unit 10 or the extension unit 20 in the cable direct-connection power supply manner.

The first threshold and the second threshold may be the same or may be different. In a specific implementation, the setting may be performed based on a hardware attribute.

For ease of understanding, the following describes in detail a connection manner between the power supply unit 201, the basic computing unit 10, and the extension unit 20 with reference to an example.

Generally, a voltage requirement of a CPU in the basic computing unit 10 is relatively large, and a voltage requirement of a component in the extension unit 20 is relatively small. In this case, the basic computing unit 10 may be powered in a direct-connection power supply manner, and the extension unit 20 may be powered in an inter-board transfer manner. Specifically, the power supply unit 201 may be directly connected to the basic computing unit 10 through a cable. The basic computing unit 10 performs direct current (DC)/alternating current (AC) conversion through the first power supply interface, and performs voltage division based on a requirement of the component on the basic computing unit 10 or a requirement for connecting the extension component, to supply power to each component on the basic computing unit. The second power supply interface of the extension unit 20 may be connected to the first power supply interface of the basic computing unit 10. The basic computing unit 10 uniformly performs voltage allocation, and implements resource allocation based on a power supply requirement of the component on the extension unit 20.

In addition, it should be noted that, the first power supply interface may implement a function of a power conversion circuit, that is, the first power supply interface may implement a function required for power supply conversion such as conversion between a direct current and an alternating current. Optionally, on the basic computing unit 10, the power conversion circuit may be further disposed outside the first power supply interface, and the power conversion circuit implements the function required for power supply conversion, such as conversion between the direct current and the alternating current.

It should be understood that the first external interface 11 is a set of the first power supply interface, the data interface, and the management interface, but is not a slot in a physical form. In the physical form, the first external interface 11 may have a plurality of forms. For example, the first power supply interface, the data interface, and the management interface may be separately set as an independent interface, or may be an integrated interface, that is, the power supply interface, the data interface, and the management interface are implemented by one interface.

Further, based on different forms of the first external interface 11, the extension unit 20, the functional unit 30, and the heat dissipation unit 302 may be separately connected to the basic computing unit 10 in the following manners:

Manner 1: The extension unit 20 is connected to the basic computing unit 10 through the slot.

The basic computing unit 10 is provided with the slot, and the extension unit 20 is provided with a socket adapted to the slot, and is inserted into the slot on the basic computing unit 10 through the socket, to access the basic computing unit 10. The extension unit 20 interacts with the basic computing unit 10 through the slot.

Manner 2: The functional unit is connected to the basic computing unit 10 through the extension unit 20.

The extension unit 20 is inserted into the basic computing unit 10 through the slot, and the functional unit (for example, the I/O unit 202 in FIG. 3) is connected to the extension unit 20. The extension unit 20 communicates with the basic computing unit 10 by using the management interface in the first external interface 11, for example, performs low speed data interaction through an inter-integrated circuit (IIC or $I^2C$) protocol. The $I^2C$ is a simple and bidirectional two-wire synchronous serial bus, and only two lines are required to transmit information between components connected to the bus.

In a specific embodiment, the management interface in the slot of the basic computing unit 10 is a serial port compatible with the $I^2C$ bus protocol. The extension unit 20 is inserted into the slot of the basic computing unit 10, and communicates with the basic computing unit 10 through an $I^2C$ bus, for example, inserted into a board 202 with a universal serial bus (USB) interface. In this way, data interaction between the board and the basic computing unit 10 can be implemented through the $I^2C$ bus, and data input and control functions can be implemented.

A high speed I/O unit such as a graphics card may also be connected to the basic computing unit 10 through the extension unit 20 in a similar manner. Specifically, the extension unit 20 is inserted into the basic computing unit 10 through the slot, and the I/O unit such as a graphics card is connected to the extension unit 20 through an interface on the extension unit 20, and communicates with the basic computing unit 10 by using a high speed interface in the external interface 11, for example, performs high speed data interaction through a PCIe bus. In a specific embodiment, the extension unit 20 is inserted into the basic computing unit 10 and communicates with the basic computing unit 10 through the PCIe bus. A PCIe slot is disposed on the extension unit 20, and a graphics card having a PCIe interface is inserted into the PCIe slot of the extension unit 20. Therefore, through the extension unit 20, high speed data interaction is implemented between the graphics card and the basic computing unit 10 through the PCIe bus.

Manner 3: The functional unit or the heat dissipation unit is directly connected to the basic computing unit 10.

In a specific implementation, the heat dissipation unit may be inserted into the basic computing unit 10 through the slot, and low speed data interaction is performed with the basic computing unit 10 by using the slot, for example, a management control signal is transmitted through the $I^2C$ bus protocol, to implement a heat dissipation function for the component.

Similarly, the storage unit such as a hard disk drive may also be connected to the basic computing unit 10 through a slot or a connector. Specifically, the basic computing unit 10 further has a slot that is the same as the high speed interface in the first external interface 11. The storage unit such as a hard disk drive is inserted into the slot on the basic computing unit 10, and high speed data interaction is performed with the basic computing unit 10 through the slot, for example, through the PCIe protocol, thereby implementing high speed read/write of the storage unit such as the hard disk drive.

Other functional units may be connected to the basic computing unit 10 in the foregoing corresponding manner, to implement data transmission or management control, which is not described one by one herein.

It should be noted that the slot may be divided into a single slot and an integrated slot. The single slot refers to that the first power supply interface, the data interface, and the management interface are separately constructed into different single slots on the basic computing unit. The integrated slot refers to that the first power supply interface, the data interface, and the management interface are integrated together and constructed on the basic computing unit, or any two of the first power supply interface, the data interface, and the management interface are separately constructed on the basic computing unit.

It may be understood that a specific physical connection manner between the functional unit and the extension unit or the basic computing unit may be selected based on an actual product design requirement, to satisfy a requirement for internal space utilization of the computing device.

In a possible implementation, Table 1 shows an example of an interface of a first external interface 11, and includes an interface type, an interface name, and a function description.

TABLE 1

Example of a first external interface

| Interface type | Interface name | Function description |
|---|---|---|
| First power supply interface | Direct current power interface (DC) | Power input of the basic computing unit, which may be set based on a service requirement, for example, 12 V |
| Data interface | Flexible I/O (Flexible I/O) interface | Including a high speed interface for transmitting data through a high speed bus interface and a low speed interface for performing low speed data interaction through a SAS bus protocol. The flexible I/O interface refers to a general term of a high speed interface supported by the processor. For example, a data transmission mode that supports two or more bus interfaces of a PCIe/CXL/UB/HCCS/SAS/SATA may be referred to as the flexible I/O. |
| Management interface | HiSPort, $I^2C$, universal asynchronous receiver/transmitter (UART), and joint test action group (JTAG) A low pin count bus (LPC)/ block transfer controller (BTC), a serial peripheral interface (SPI), a USB, | Configured to implement data transmission and interaction between the basic computing unit and the functional unit through a low speed bus interface. |

TABLE 1-continued

| Example of a first external interface | | |
|---|---|---|
| Interface type | Interface name | Function description |
| | a direct media interface (DMI), a network controller sideband interface (NCSI), and a 3.3 V standby power (STBY 3V3) | |

It should be noted that the division of the first external interface is merely an example. In a specific implementation process, different interfaces may be selected based on a service requirement to transmit different types of signals or data. Divisions of specific interfaces included in various types of interfaces do not constitute a limitation on this application.

Based on the description of the first external interface in Table 1, the basic computing unit 10 inputs a 12 V direct current power through the first power supply interface, and then converts, through a power conversion module (for example, but is not limited to a direct current-direct current conversion module) on the basic computing unit 10, the 12 V direct current power into a corresponding voltage required for running of each component and functional unit on the basic computing unit 10. Certainly, an input voltage of the basic computing unit 10 is also not limited to the direct current 12 V, and another voltage such as a direct current 48 V may also be used.

It should be noted that the PCIe interface is a high speed interface supported by most processors currently. Considering upgrade and replacement of CPUs and differentiation of CPUs of different architectures, in this embodiment, in addition to the PCIe interface, the high speed interface may also use an interface form such as the CXL/UB/HCCS/SAS/SATA. In a specific implementation, the foregoing interface, such as the PCIe/CXL/UB/HCCS/SAS/SATA, may be flexibly configured through, but not limited to, the Flexible I/O interface mode formed by using UBC and UBC-DD connectors.

Figure 4:
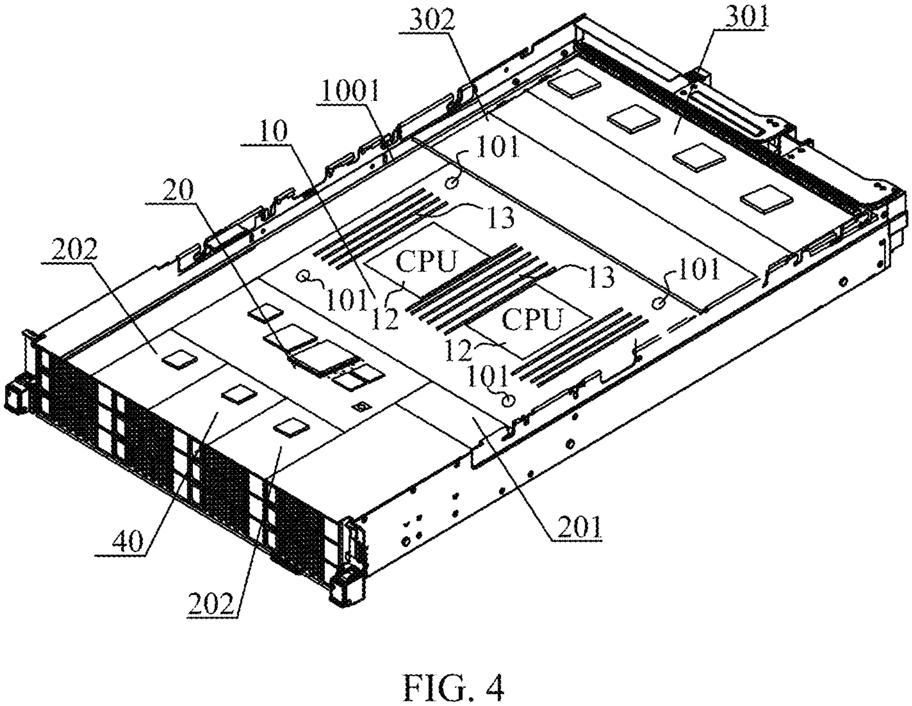
FIG. 4 is a schematic structural diagram of a server according to this application.

The following further explains, with reference to FIG. 4, a schematic structural diagram of a server including a motherboard architecture in this application.

As shown in FIG. 4, the server includes a chassis 1001, and the chassis 1001 includes a basic computing unit 10, an extension unit 20, a storage unit 301, and a heat dissipation unit 302. The basic computing unit 10 adapts to a fixing structure on the chassis 1001 through a fixing hole 101, to implement a fixed connection between the basic computing unit 10 and the chassis 1001. Two CPUs 12 are configured on the basic computing unit 10, each CPU is provided with a plurality of main memory slots, each main memory slot is inserted with a main memory 13, and the extension unit 20 is connected to the basic computing unit 10. The power supply interface and the data interface are disposed on the extension unit 20. The power supply unit 201 is configured to supply power to the computing device. The baseboard management controller 40 is inserted into the extension unit 20 through the slot. The storage unit 301 and the heat dissipation unit 302 are separately inserted into the basic computing unit 10 through slots.

To meet a service requirement, a physical size of the basic computing unit may be determined based on a quantity and a size of components configured on the basic computing unit. In a specific implementation, a physical size of a board body of the basic computing unit 10 varies with a type or a quantity of hardware configured on the basic computing unit 10, and the physical size is represented by (length×width). Table 2 is an example of physical sizes of a group of basic computing units, including basic computing units in six physical forms.

TABLE 2

| Example of physical sizes of a group of basic computing units | | |
|---|---|---|
| Identifier | Physical size (millimeter) | Application scenario |
| A1 | 265 × 210 | One processor, one DIMM per channel (1P1DPC) |
| A2 | 265 × 260 | One processor, one or two DIMMs (1P2DPC/1P1DPC) per channel |
| B1 | 265 × 330 | Two processors, one DIMM per channel (2P1DPC)<br>One processor, one or two DIMMs (1P2DPC/1P1DPC) per channel |
| B2 | 265 × 426 | Two processors, one or two DIMMs per channel (2P2DPC/2P1DPC)<br>One processor, one or two DIMMs (1P2DPC/1P1DPC) per channel |
| C1 | 468 × 330 | Four processors, one DIMM (4P1DPC) per channel<br>Two processors, one or two DIMMs per channel (2P2DPC/2P1DPC) |
| C2 | 468 × 426 | Four processors, one or two DIMMs per channel (4P2DPC/4P1DPC)<br>Two processors, one or two DIMMs per channel (2P2DPC/2P1DPC) |

In Table 2, "P" represents a quantity of processors, and "DPC" represents a dual in-line memory module per channel (DIMM Per Channel).

With reference to the accompanying drawings, the following further describes a manner of fixing basic computing units of different sizes to the chassis.

In a possible embodiment, a mounting hole is provided on the basic computing unit, and the mounting hole adapts to the fixing structure on the server chassis shown in FIG. 4. In order to ensure that the chassis can adapt to basic computing units of a plurality of different physical forms, to adapt to update and upgrade of the basic computing unit, some fixing structures in a plurality of fixing structures on the chassis are reused to implement fixed connection between basic computing units of different sizes and the chassis, thereby reducing engineering design difficulty.

Refer to the basic computing unit 10 in FIG. 1, an example in which four fixing holes 101 are provided is used. A hole size of each mounting hole and a horizontal and vertical relative position of each mounting hole are set based on the foregoing principle, so that the basic computing unit can be reliably assembled at a corresponding installation position on the chassis. Corresponding mounting holes on basic computing units of different physical forms are configured based on the plurality of fixing structures on the chassis. On one hand, flexible assembly and installation between the basic computing unit and the server chassis may be facilitated, and assembly and overhaul and maintenance operations may be easily performed. On the other hand, a standard installation hole is used. During specific application, different basic computing units may be installed based on an installation position of the same server chassis, for example, but is not limited to basic computing units of different CPU models, different CPU architectures (ARM/X86), or different CPU manufacturers (Intel/AMD/Phytium/Kunpeng), and basic computing units of different manufacturers can be directly replaced. This setting can satisfy differentiated customer scenarios and application requirements.

In a specific implementation, the fixing structure on the chassis may be divided into at least one group of fixing structures based on a position relationship, and one group of fixing structures in the at least one group of fixing structures may be adapted to basic computing units of different sizes. That is, based on a quantity of adapted CPUs and a quantity of adapted main memories, the basic computing unit may have different sizes, and relative positions and hole spacings between mounting holes on the basic computing unit of corresponding sizes are not completely the same. In this solution, one of the groups of the fixing structures on the chassis may be adapted to the basic computing unit of the corresponding size, thereby satisfying quick disassembly and assembly operations of the basic computing units of different sizes. In another specific implementation, the at least some fixing structures may be divided into at least two fixing structure groups as a fixing structure grouping rule on the chassis, so that adaptability may be further improved.

It should be noted that the mounting hole on the basic computing unit may include a fixing hole 101 and a positioning hole 102. The fixing hole 101 is configured to be fixed on a corresponding fixing structure through a fastener, for example, but is not limited to a screw or a buckle piece. The positioning hole 102 is configured to be positioned on the fixing structure through a limiting structure, for example, a positioning pin. In this case, a fixing structure adapted to the fixing hole 101 in the chassis may be a screw hole, and a fixing structure adapted to the positioning hole 102 in the chassis may be a guide hole. Certainly, in another specific application, the fixing structure may also be in another structure form, provided that a function requirement of quickly disassembling and disassembling the basic computing unit is satisfied.

Optionally, in addition to the four mounting holes disposed in the basic computing unit 10 shown in FIG. 1, more or fewer mounting holes may be disposed based on a size of the basic computing unit. A quantity of mounting holes does not constitute a limitation on this application.

Figure 5:
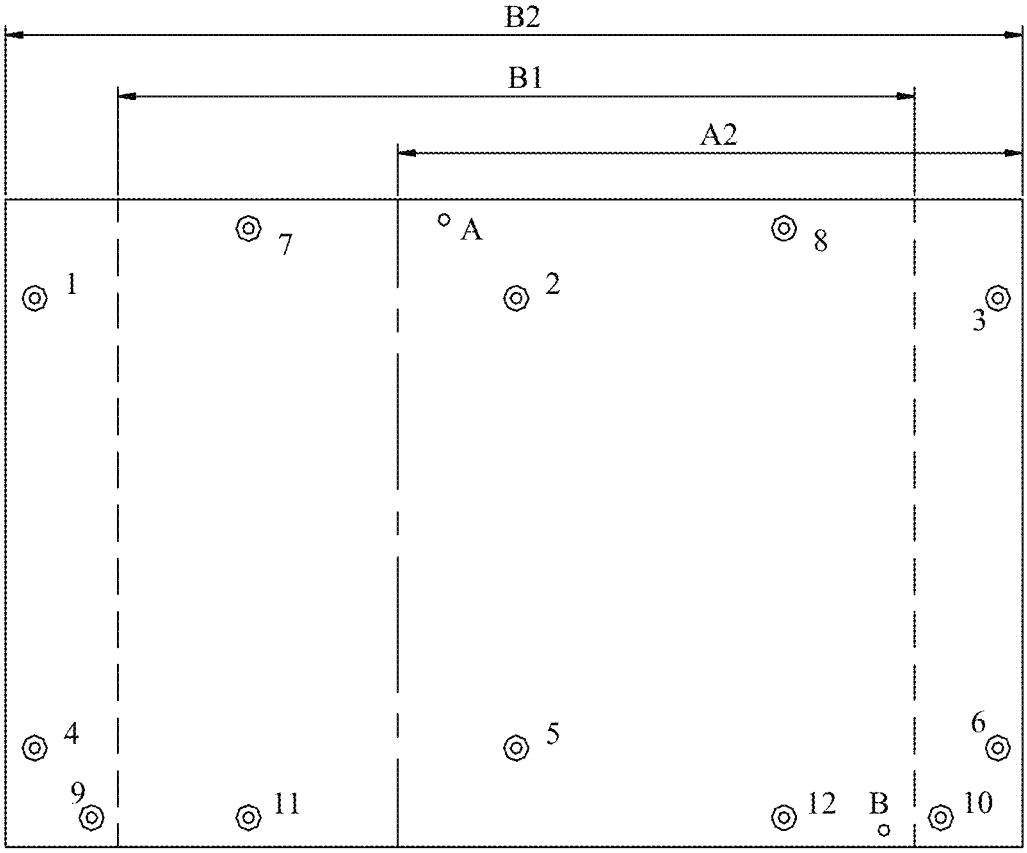
FIG. 5 is a schematic diagram of arrangement of a fixing structure on a server chassis according to an embodiment of this application.
Figure 6:
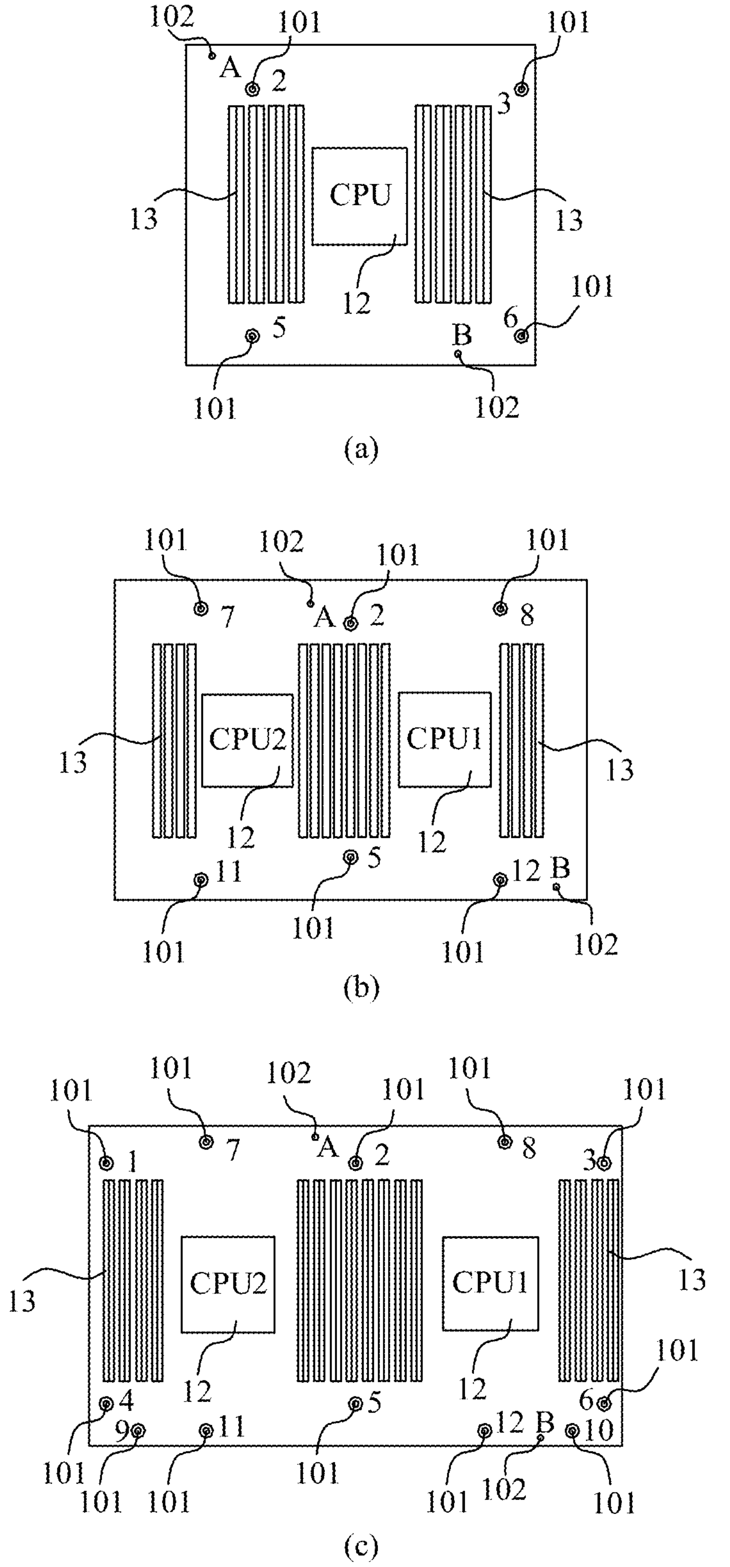
FIG. 6 is a schematic structural diagram of a group of basic computing units of different physical sizes according to this application.

With reference to FIG. 5 and FIG. 6, the following describes in detail how to reuse the fixing structure in the chassis.

As shown in FIG. 5, each fixing structure on the chassis includes twelve screw holes (1 to 12) and two guide holes (A and B). The twelve screw holes (1 to 12) may be divided into three groups, which are respectively shown by extension lines A2, B1, and B2. During specific assembly, different holes are selected for different types of basic computing units, and a corresponding screw installation constraint specification is followed during chassis design. For example, in a region that may be used to set the fixing structure in the chassis, a quantity and a position of the fixing structure are set based on at least one of a size and a weight of the basic computing unit, so that a same chassis can simultaneously support three types of basic computing units A2, B1, and B2 shown in FIG. 6. The region that may be used to set the fixing structure in the chassis is based on space and layout that need to be occupied by hardware such as a printed circuit board, a fan, an air duct baffle, power, and a fan that needs to be placed in the chassis, and is a space reserved for a fixing mechanism. A size and a position of the space may be set based on a service requirement.

FIG. 6 is a schematic structural diagram of three different basic computing units A2, B1, and B2 in Table 2.

As shown in the figure, FIG. 6(*a*) shows a A2-form basic computing unit in Table 2. One CPU is configured on the basic computing unit, and an architecture of two DIMM slots (2 DIMM Per Channel) is used for each channel. Therefore, the basic computing unit is configured with sixteenth main memory slots, and the sixteenth main memory slots are divided into two groups, which are respectively disposed on two sides of the one CPU. FIG. 6(*b*) shows a B1-form basic computing unit in Table 2. Two central processing units CPUs are configured on the basic computing unit, and an architecture of one DIMM slot (1 DIMM Per Channel) is used for each channel. Therefore, the basic computing unit is configured with sixteenth main memory slots, the sixteenth main memory slots are divided into four groups, and each group has four main memory slots, which are respectively disposed on two sides of the two CPUs. FIG. 6(*c*) shows a B2-form basic computing unit in Table 2. Two central processing units CPUs are configured on the basic computing unit, and an architecture of two DIMM slots (2 DIMM Per Channel) is used for each channel. Therefore, the basic computing unit is configured with thirty-two main memory slots, and the thirty-two main memory slots are divided into two groups, which are respectively disposed on two sides of the two CPUs.

The fixing holes on the three forms of basic computing units correspond to the three groups of screw holes on the chassis, as shown in Table 3.

TABLE 3

Example of screw holes in a basic computing unit

| Basic computing unit numbers | Screw holes | Guide holes |
|---|---|---|
| A2 | 2, 3, 5, 6 | A, B |
| B1 | 2, 7, 8, 5, 11, 12 | A, B |
| B2 | 1 to 12 | A, B |

In this embodiment, the screw holes 2 and 5 on the chassis are reused in assembling the A2-form basic computing unit, the B1-form basic computing unit, and the B2-form basic computing unit, the screw holes 2, 3, 5, and 6 are reused in assembling the A2-form basic computing unit and the B2-form basic computing unit, and the screw holes 5, 7, 8, 11, and 12 are reused in assembling the B1-form basic computing unit and the B2-form basic computing unit. It may be understood that, in other server chassis of different sizes, screw holes may be divided according to the foregoing reuse principle to replace basic computing units of different performance forms.

In addition, in an assembly relationship between the basic computing unit and the chassis in this embodiment, a pre-installation positioning function is further provided through a positioning hole and the guide hole. Certainly, the two guide holes A and B shown in FIG. 5 are shared by the basic computing units in the three forms shown in the figure. It may be understood that, based on a case in which a size span of a replaceable board body is relatively large, the guide hole may also be divided according to the foregoing multiplexing principle, and details are not described herein again.

It can be learned that different types of basic computing units may be interchanged and adapted to the same server chassis through standardized constraints of parameters such as compatibility between a physical size and a mounting hole, thereby facilitating upgrade and replacement of the basic computing unit.

The conventional motherboard is split into a basic computing unit and an extension unit that can be standardized, and only basic components such as a CPU and a main memory that provide a general computing capability are configured on the basic computing unit 10, so that the functional unit can be adapted to a maximum flexibly, thereby simplifying design, reducing a development workload, and reducing a motherboard design period and difficulty. Further, basic computing units of different sizes are separately disposed based on a quantity and a size of the processors. When computing power expansion or cross-platform upgrade involving processor type replacement needs to be implemented for the computing device, only the basic computing unit needs to be replaced to quickly complete the computing power expansion or cross-platform upgrade operation, thereby improving processing efficiency of capacity expansion or upgrade. In addition, units in the system are completely decoupled, and the physical interfaces, electrical features, management protocols, and parameters between the units are standardized. The physical sizes of all modules except the basic computing unit can be defined and selected as required, which makes the motherboard architecture design more flexible and satisfies different service requirements.

In a possible embodiment, in addition to being split into one basic computing unit and one extension unit, the conventional motherboard may have a plurality of extension units. In a specific implementation process, the extension component such as the I/O unit, the storage unit, the acceleration unit, or the memory expansion unit may be separately connected to one or more extension units based on a function difference, and then connected to the basic computing unit through the extension unit connected to the extension component. For example, the extension unit may be divided into a peripheral interaction extension unit, a data processing extension unit, and the like based on the function, to facilitate management of the extension component. Alternatively, the extension unit may be divided into a storage unit extension unit, an I/O unit extension unit, or the like based on different components.

Optionally, in addition to the connection between the extension component and the extension unit based on a hardware type, the extension component may also be connected to one or more extension units based on a quantity and a size of to-be-connected extension components, to be in communication with the basic computing unit through the extension unit. The plurality of extension units are further divided based on an integration degree or different manufacturers, and each extension unit may be connected to the basic computing unit through the external interface.

In a possible embodiment, based on the structure of the motherboard, this application further provides a technical solution for automatic identification and configuration management of a functional unit in a computing device. Hardware self-description information of the functional unit is preset on the functional unit, a corresponding functional unit management object template is configured on the baseboard management controller BMC, and a management object instance of the functional unit is generated based on the hardware self-description information of the functional unit, thereby implementing automatic identification, monitoring and management of the functional unit. In this way, the manufacturer of the functional unit such as the I/O unit is not limited to the architecture, version, or model of the CPU, and only needs to comply with a standard definition of the external interface on the basic computing unit and configure corresponding hardware self-description information based on the standard definition of the hardware self-description information, the BMC can automatically discover and configure the functional unit. In this way, after the basic computing unit is decoupled from the functional unit such as the I/O unit, the manufacturer of the functional unit has greater design and production flexibility, which can promote development and progress of the manufacturer of the functional unit such as the I/O unit.

It should be understood that, based on a design concept of the hardware self-description information and the management object template in embodiments of this application, the basic computing unit and the extension unit in embodiments of this application may also preset self-description information, and a corresponding management object template is configured on the baseboard management controller BMC, to further optimize a motherboard design.

Specifically, the basic computing unit has built-in basic computing unit self-description information defined based on a basic computing unit management object template, and the basic computing unit management object template is preset on the baseboard management controller BMC. The baseboard management controller BMC identifies and configures hardware information such as the processor and the main memory in a manner based on the basic computing unit management object template, and generates a basic computing unit management object instance, to implement automatic identification and adaptation management of the basic computing unit. In this embodiment, not only compatibility of the processor, the main memory, and the like is improved, but also, as long as management object templates of processors of different architectures, different models, or versions are configured, CPUs of different architectures and different generations can be automatically adapted, without upgrading baseboard management controller BMC software, thereby facilitating upgrade and maintenance of the basic computing unit.

Further, the extension unit has built-in extension unit self-description information defined based on an extension unit management object template, and may include expansion interface description information, management interface description information, and the like. Correspondingly, the baseboard management controller BMC is preset with the extension unit management object template, and generates an extension unit management object instance based on the extension unit self-description information, thereby implementing automatic identification and adaptation management of the extension unit. In this way, when a standard of the extension interface or the management interface is changed, for example, an interface definition is changed, or an interface rate is changed, the baseboard management controller BMC may obtain a new interface through the extension unit self-description information and by constructing the corresponding management object template, the extension unit does not need to be redesigned or developed, and baseboard management controller BMC software does not need to be upgraded, thereby improving adaptability and compatibility of the extension unit.

According to the motherboard provided by this embodiment, the BMC may support automatic identification and configuration of the functional unit such as the I/O unit. Corresponding to different types of functional units, the baseboard management controller is preset with management object templates corresponding to different types of functional units. Each type of management object template is configured to record information about each type of component, for example, information such as a serial number, a manufacturer, and a type.

According to different types of management object templates, hardware self-description information is separately defined for different types of functional units, and the hardware self-description information is stored in the storage region of the functional unit. After the basic computing unit is powered on, the baseboard management controller may obtain hardware self-description information in the storage region of the functional unit, to implement automatic detection and identification functions of hardware of the baseboard management controller, and then write configuration information in the hardware self-description information into a corresponding position in a corresponding management object template in the BMC, so as to create a specific management object instance of the functional unit, which is equivalent to a driver of the functional unit, thereby implementing automatic identification and configuration of the corresponding functional unit.

Further, based on the mechanism, automatic discovery and configuration of the unit can be fully supported, code-free development and management of the unit can be implemented, and a server device management function can be provided externally. In this solution, a new model can be directly powered on and run after a basic computing unit of a same CPU series is replaced. Certainly, for a basic computing unit of a different CPU series, a software version of a corresponding CPU series is set in the BMC, and the basic computing unit can also be replaced.

The following uses automatic identification and adaptation of the functional unit as an example, to describe in detail a detailed technical solution of implementing automatic identification and adaptation of the functional unit based on the baseboard management controller BMC in this application.

Figure 7:
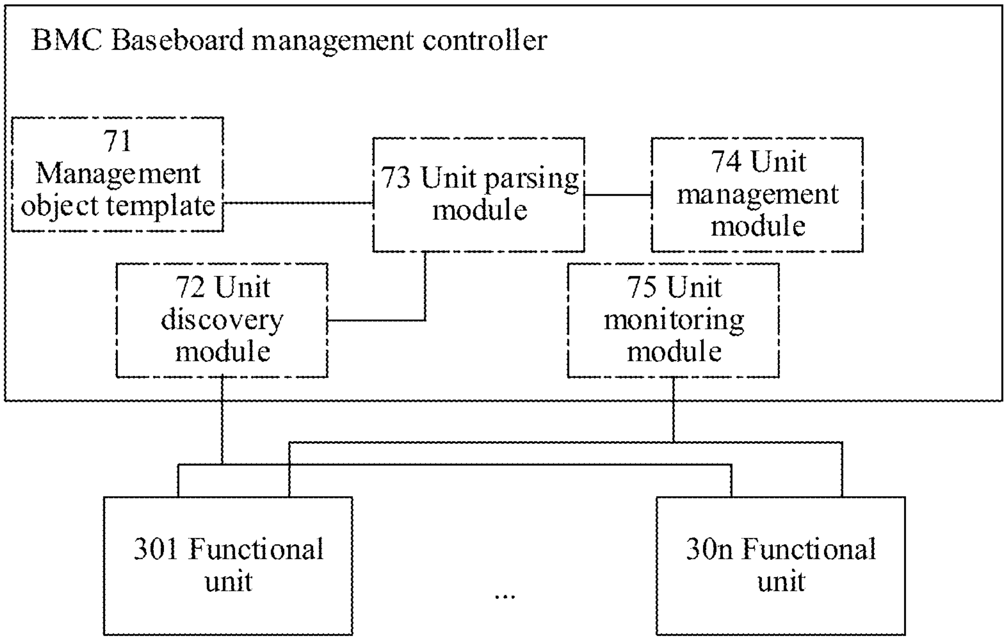
FIG. 7 is a schematic structural diagram of a baseboard management controller according to an embodiment of this application.

FIG. 7 is a schematic block diagram of composition of software modules of a baseboard management controller according to an embodiment of this application. The baseboard management controller implements automatic identification, monitoring and management of the functional unit. The baseboard management controller is preset with a management object template 71 corresponding to each functional unit for different types of functional units 30. In addition, corresponding hardware self-description information is defined for different types of functional units (301 . . . 30*n*).

Figure 8:
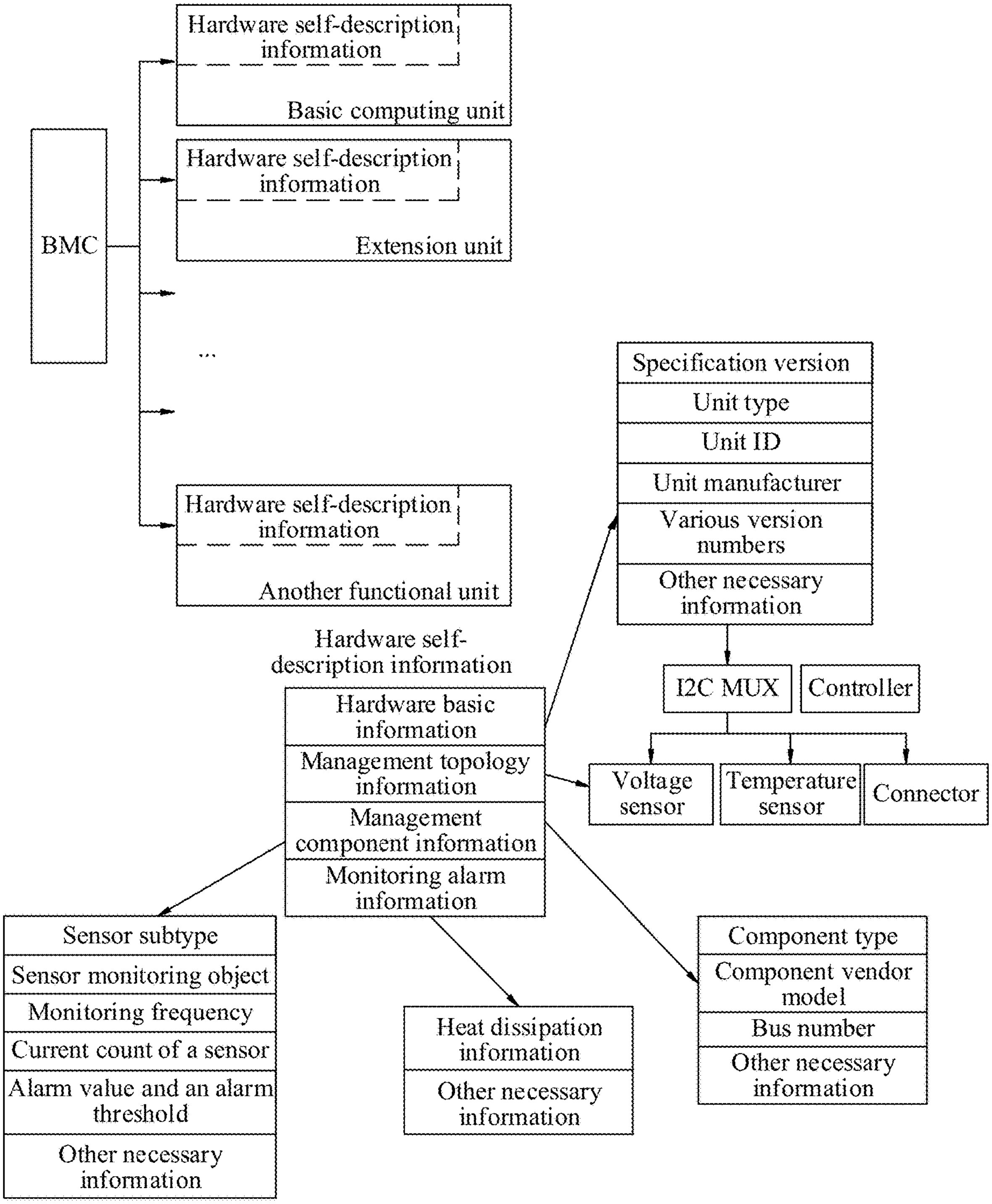
FIG. 8 is a schematic diagram of a logical relationship diagram of hardware self-description information according to an embodiment of this application.

As shown in FIG. 8, the hardware self-description information may include hardware basic information, management topology information, management component information, and monitoring alarm information. The hardware basic information is for identifying corresponding functional hardware or basic computing unit, and includes attribute categories such as a specification version, a unit type, a unit identifier (ID), a unit manufacturer, and various version numbers that facilitate automatic identification and adaptation. The "specification version" refers to a version number that complies with a specified specification, for example, a specified version number defined by the BMC, to facilitate unified management. The "unit type" refers to the extension unit, the basic computing unit, the I/O unit, and the acceleration unit (for example, an acceleration card, a system on chip, and a service driver infrastructure card). The unit type corresponds to different types of management object templates. The "unit ID", that is, an ID number of a unit, is formed based on a generation rule defined in the BMC specification, for example, but is not limited to a form of "manufacturer ID+serial number". In a specific implementation, main composition of the hardware basic information of different unit types may be determined based on characteristics of the different unit types. The management topology information is for creating a management topology for the functional unit, including categories such as a temperature sensor, a voltage sensor, a connector, and $I^2C$ multiplexer (MUX). The management component information is for identifying an attribute of the functional unit, including categories such as a component type, a component manufacturer model, a product line number, and other necessary information. The monitoring alarm information is for monitoring a working status of the functional unit, and is for indicating whether the functional unit runs normally, including attribute categories such as a sensor type, a sensor subtype, a sensor monitoring object, a monitoring frequency, a current count of a sensor, an alarm value, an alarm threshold, and other necessary information. The sensor type includes a temperature sensor, a voltage sensor, a current sensor, and the like. The temperature sensor is further divided into two subtypes: a thermal resistance sensor and a thermocouple sensor. Types and subtypes of other sensors are divided based on common sense in the industry, and details are not described herein again. The current count of the sensor is a detection value of the sensor. The alarm value indicates a single physical value of an upper alarm threshold or a lower alarm threshold. The alarm threshold indicates a value range formed by the upper alarm threshold and the lower alarm threshold. Certainly, for a unit that needs to be monitored in real-time in a system running process, for example, a hard disk, hardware self-description information of the unit of this type further includes monitoring alarm information, for example, but is not limited to heat dissipation information. In this way, when a working temperature of the hard disk exceeds the threshold, corresponding heat dissipation management control is performed.

Generally, individual functions and management requirements of different types of functional units have respective characteristics, and corresponding self-description information needs to be set separately based on the unit types.

Based on the foregoing description, hardware self-description information is stored in a storage region in each functional unit. After the motherboard is powered on, the baseboard management controller automatically detects a connected functional unit, obtains hardware self-description information of the functional unit by reading a fixed storage region in the functional unit, parses the hardware self-description information, and assembles the hardware self-description information into the management object template to create the management object instance of the functional unit, thereby implementing automatic identification and monitoring and management of each functional unit in this application.

It may be understood that, the hardware self-description information defined based on the foregoing management control logic is preset in the storage region of the functional unit by a matching manufacturer before delivery, so that the flexibly combined functional unit satisfies automatic identification and adaptation in the motherboard architecture.

Compared with the conventional motherboard architecture, in this embodiment, management software of the baseboard management controller is decoupled from a managed functional unit, and the update or replacement of the functional unit does not generate development investments of re-developing software or upgrading software. In other words, to adapt to a newly designed functional unit, the conventional motherboard needs to upgrade the management software of the baseboard management controller, and add a definition and hardware information of the newly designed functional unit for identification and application. However, in the solutions of this application, the management object module on the baseboard management controller is a standardized unified structure, and each functional unit stores hardware self-description information of each functional unit on the corresponding functional unit itself. After the newly designed functional unit is connected to the motherboard, the management object instance can be automatically generated by reading the hardware self-description information of the functional unit and adapting the hardware self-description information to the corresponding management object template. The management software of the baseboard management controller can automatically identify the newly designed functional unit without upgrading, in addition, automatic adaptation is performed to ensure that the newly designed functional unit can be used normally.

Figure 9:
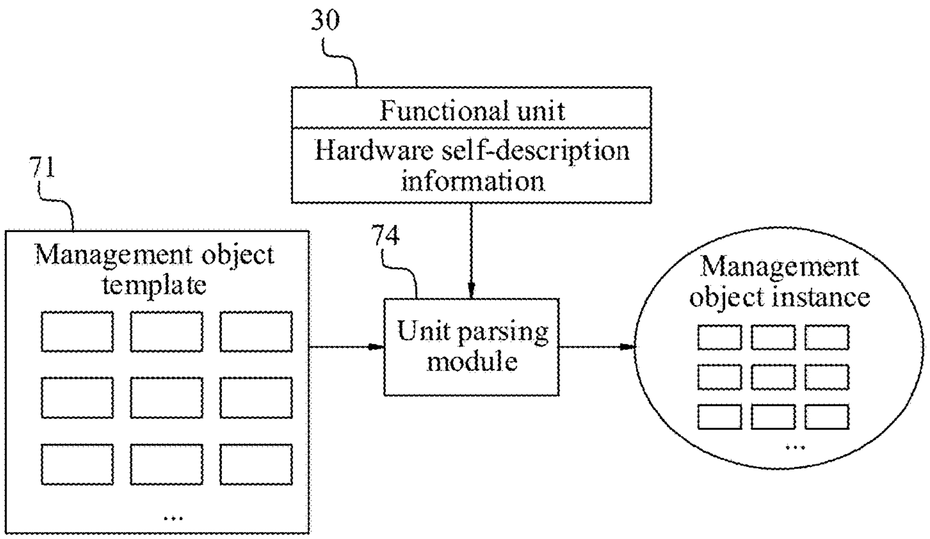
FIG. 9 is a schematic flowchart of generating a management object instance by a BMC according to an embodiment of this application.

A process of automatic identification and adaptation of the functional unit is shown in FIG. 7 and FIG. 9. After a new functional unit (301 . . . 30*n*) is added to the motherboard, the baseboard management controller may obtain hardware self-description information of each functional unit through the unit discovery module 72. The unit parsing module 73 explains the hardware self-description information, and automatically generates a management object (such as a sensor management object and a chip management object) corresponding to the functional unit based on the management object template 71, and the unit management module 74 performs management.

Herein, a generated management object itself includes management information necessary for a new functional unit, so as to ensure that the baseboard management controller can perform adaptive management on the new functional unit. Therefore, in different application scenarios of flexible combination of the functional unit, based on the baseboard management controller management mechanism in this solution, the function of managing a newly accessed functional unit can be achieved by automatically obtaining self-description information of the newly accessed functional unit.

In a possible embodiment, hardware self-description information corresponding to different types of hardware is not completely the same, to separately satisfy management adaptation requirements. The following uses a graphics card as an example. A specific process of generating a management object instance by a management object template based on hardware self-description information is as follows:

Step 1: After the graphics card is connected to the basic computing unit or the extension unit through the PCIe interface, the baseboard management controller first reads hardware self-description information of the graphics card from the graphics card, including: hardware basic information such as a name of a functional unit (graphics card), a model of the graphics card, and a manufacturer, and performance parameters such as a resolution and a refresh frequency.

Step 2: The baseboard management controller finds a corresponding management object template based on the hardware basic information in the hardware self-description information of the graphics card.

Step 3: The baseboard management controller parses the hardware self-description information to obtain management topology information, management component information, and monitoring alarm information of the graphics card, assembles the hardware self-description information into the management object template, and automatically generates the management object instance of the graphics card.

In addition, in a running process of the computing device, each functional unit may also be monitored through a unit monitoring module 85 of the baseboard management controller BMC.

In addition, in another embodiment, the heat dissipation information may be further defined in the hardware self-description information of the functional unit, to implement customized and flexible management of the functional unit having a special heat dissipation requirement. Specifically, a recommended target temperature and a maximum threshold temperature of the functional unit may be defined in the hardware self-description information.

Figure 10:
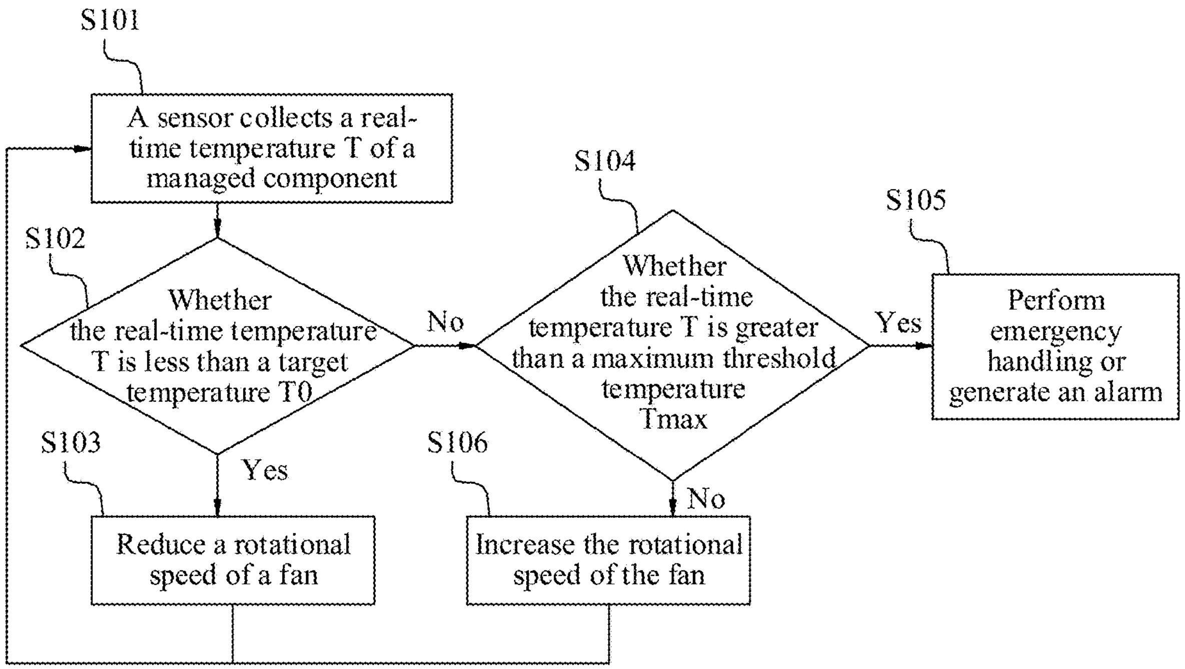
FIG. 10 is a schematic flowchart of adaptive heat dissipation control according to an embodiment of this application.

In a possible implementation, this application further provides a technical solution of an adaptive heat dissipation control method. FIG. 10 is a flowchart of an adaptive heat dissipation control method according to this application. Adaptive heat dissipation control is completed by a heat dissipation management program, and the heat dissipation management program may be stored in the baseboard management controller or the BIOS. Herein, an example in which the heat dissipation management program is stored in the baseboard management controller is used. For a functional unit that has a heat dissipation requirement, the baseboard management controller performs heat dissipation management control by using a proportional-integral-derivative (PID) control algorithm, and using a real-time temperature T of the functional unit, a target temperature TO of the functional unit, and a maximum threshold temperature Tmax that are obtained by the sensor as inputs of the PID control algorithm. The real-time temperature T indicates a current temperature of the functional unit; the target temperature T0 indicates a temperature or a temperature range at which the functional unit can work normally; and the maximum threshold temperature Tmax indicates a limit temperature at which the functional unit runs, and if the temperature is exceeded, the component is damaged or cannot work normally. The real-time temperature T, the target temperature T0 of the functional unit, and the maximum threshold temperature Tmax vary based on the type or manufacturer of the component. For functional units having different heat dissipation requirements, the target temperature T0 and the maximum threshold temperature Tmax of the functional units are set to different temperatures. Using a graphics card as an example, the target temperature T0 of heat dissipation management is 50° C., and the maximum threshold temperature Tmax is 95° C. The adaptive heat dissipation control method includes the following steps:

S101: A baseboard management controller BMC collects a real-time temperature T of a functional unit, for example, a graphics card, through a temperature sensor.

The temperature sensor is disposed on the graphics card or within an effective range of the real-time temperature T of the graphics card that can be collected. The temperature sensor is connected to the basic computing unit or the extension unit, and communicates with the baseboard management controller BMC through the management interface.

S102: The baseboard management controller BMC determines whether the real-time temperature T is less than the target temperature T0 (50° C.); if yes, performs step S103, and a rotational speed of a fan is reduced by a step of 1% based on the proportional-integral-derivative control algorithm; and if not, performs step S104.

S104: Determine whether the real-time temperature T is greater than a maximum threshold temperature Tmax (95° C.); if yes, perform step S105 to perform emergency handling or generate an alarm; if not, perform step S106 to increase the rotational speed of the fan by a step of 1% based on the proportional-integral-derivative control algorithm.

In the heat dissipation control method, heat dissipation is performed on the functional unit by increasing the rotational speed of the fan or decreasing the rotational speed of the fan, so that the real-time temperature T of the functional unit approaches the target temperature T0, thereby satisfying a requirement of a working temperature of the functional unit.

For an in-position functional unit, after being connected to the basic computing unit or the extension unit, the baseboard management controller BMC may automatically identify and configure the in-position functional unit, and then create and generate a corresponding management object instance, where the management object instance includes the foregoing target temperature and maximum threshold temperature. The temperature sensor configured to collect the real-time temperature of the functional unit may be determined by a temperature sensor in hardware self-description information of the functional unit. That is, the baseboard management controller may determine the temperature sensor associated with the functional unit through the hardware self-description information. Optionally, a sensor configured to monitor a temperature of the functional unit may also be selected by the baseboard management controller. That is, the baseboard management controller may specify, based on a position and an effective monitoring range of a temperature sensor in the server, any temperature sensor to collect temperature information of a specified functional unit. In addition, the adaptive heat dissipation control is implemented based on the target temperature and the maximum threshold temperature in the hardware self-description information. Compared with the conventional motherboard architecture, this solution may flexibly adapt to different functional units. For a new unit or component, the adaptive heat dissipation management may be implemented, and intelligent heat dissipation management may be implemented without re-testing or upgrading temperature management software.

Certainly, for a heat dissipation solution in which temperature adjustment is implemented in an air cooling manner, the foregoing management mechanism for changing the rotational speed of the fan needs to be used for control. However, for a heat dissipation solution in which temperature adjustment is implemented in a liquid cooling manner, a flow of a refrigerant in a refrigeration cycle may be controlled, for example, the flow is not limited to controlling opening and closing of a corresponding refrigerant flow path and changing a flow opening. It should be noted that, specific functions of a manner in which a fan is used to perform air cooling heat dissipation and a manner in which a refrigerant is used to perform phase conversion heat to provide heat dissipation are not a core invention point of this application, and can be implemented by a person skilled in the art based on the conventional technology. Therefore, details are not described in this specification.

With reference to a specific example, the following further describes how to implement heat dissipation management of the power supply unit and the graphics card based on the component-based motherboard provided in this application.

In this embodiment, heat dissipation of the power supply unit is implemented by a power fan, and heat dissipation of the graphics card is implemented by a graphics card fan. A recommended target temperature and a maximum threshold temperature for heat dissipation of the power supply unit are recorded in hardware self-description information of the power supply unit, and a recommended target temperature and a maximum threshold temperature for heat dissipation of the graphics card are recorded in hardware self-description information of the graphics card. After the power supply unit and the graphics card are connected to the basic computing unit, the BMC reads the hardware self-description information in the power supply unit and the graphics card, to obtain the recommended target temperatures and the maximum threshold temperatures for heat dissipation of the power and the graphics card and manage heat dissipation for the power supply unit and the graphics card accordingly. After a new power supply unit and graphics card are replaced, because a recommended target temperature and a maximum threshold temperature of the new power supply unit and graphics card exist in hardware self-description information of the new power supply unit and graphics card, after being read by the BMC, heat dissipation solutions for the new power supply unit and graphics card are generated, and a motherboard management program does not need to be upgraded, so that a heat dissipation solution of the motherboard can be automatically adapted based on the functional unit.

In a possible embodiment, in this application, the BMC may be further used to perform verification on the validity of the functional unit or the extension unit in the server. Specifically, the BMC may use field replaceable unit description information (FRUD) to identify unit management topology information, to implement a management enhancement function based on the unit management topology information, including: BMC management port extension, invalid board addition management, customized temperature management, flexible adaptation of a unit slot, and the like. The FRUD may be disposed on the basic computing unit, the extension unit, and the functional unit.

Figure 11:
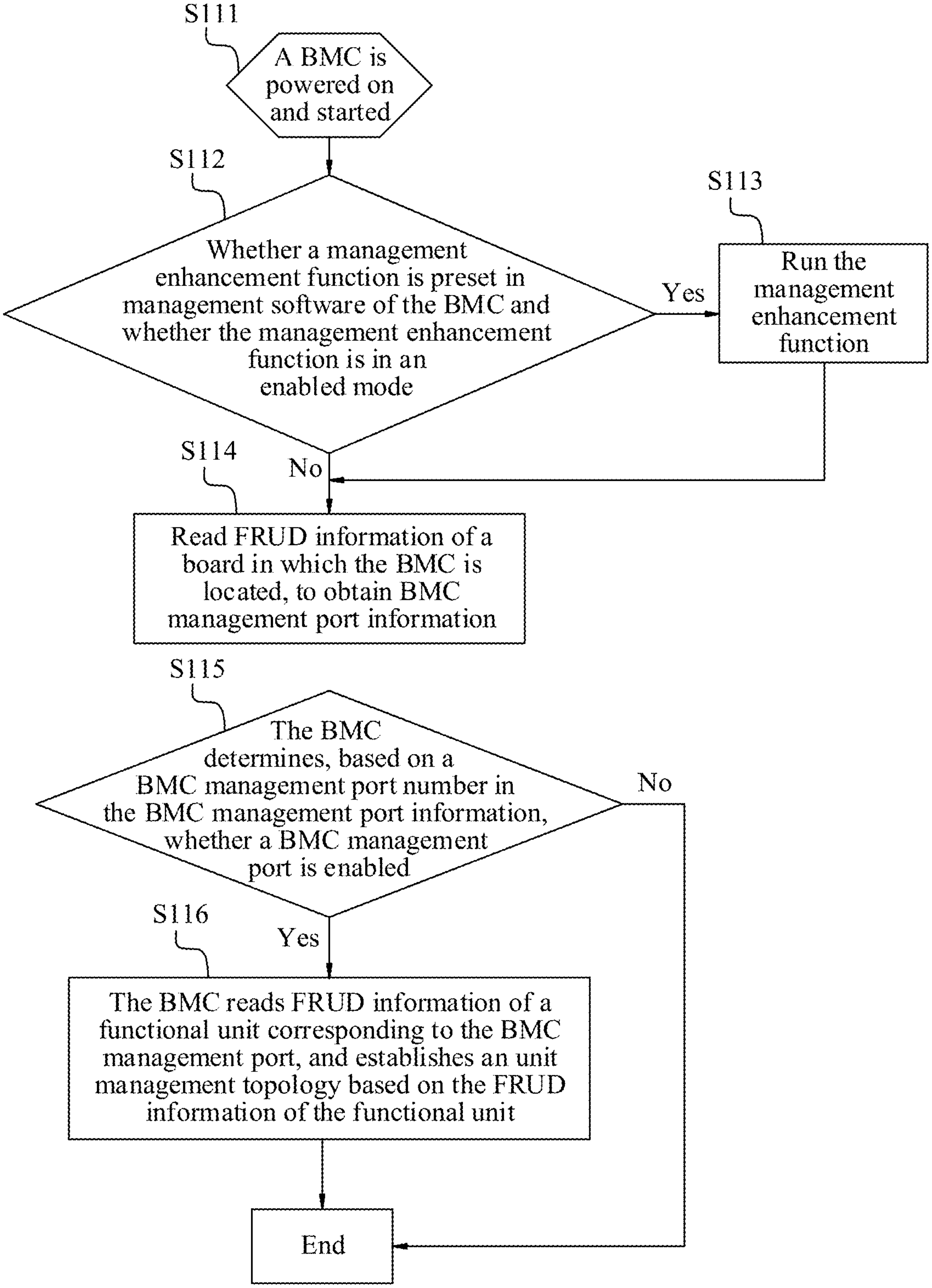
FIG. 11 is a flowchart of unit management topology self-discovery and a management enhancement function according to an embodiment of this application.

As shown in FIG. 11, a process of implementing unit management topology self-discovery and a management enhancement function by using the FRUD is as follows:

Step S111: A baseboard management controller BMC is powered on and started.

Step S112: Determine whether a management enhancement function is preset in management software of the baseboard management controller BMC and whether the management enhancement function is in an enabled mode; if yes, perform step S113; if no, perform step S114.

Step S113: Run a management enhancement function.

Step S114: Read FRUD information of a board in which the BMC is located, to obtain BMC management port information.

The BMC is usually disposed on the extension unit. In a possible implementation, the BMC may also be disposed on the basic computing unit. The BMC management port information specifies a BMC management port number and an access address of a component corresponding to the functional unit.

Step S115: The BMC determines, based on the BMC management port number in the BMC management port information, whether the BMC management port is enabled; if yes, performs step S116; if not, the process ends.

Step S116: The BMC reads FRUD information of a functional unit corresponding to the BMC management port, and establishes a unit management topology based on the FRUD information of the functional unit.

If management software of the baseboard management controller BMC does not have the management enhancement function, the BMC management port information is directly acquired, and the FRUD information of each functional unit is read through the management port, to form the unit management topology.

The management enhancement function may be used as an optional function, and is enabled by authorization, for example, by inputting or updating an activation code, to obtain authorization of the management enhancement function. After being authorized, the management enhancement function may be automatically or manually enabled or disabled.

Based on the foregoing unit management topology, a management enhancement function implemented in embodiments of this application is described in detail as follows:

1. BMC Management Port Extension.

Generally, a quantity of BMC management ports is limited, and a quantity of managed objects is much greater than the quantity of BMC management ports. Herein, the managed object may be a basic computing unit, an extension unit, or a component associated with a functional unit, for example, a temperature sensor, a voltage sensor, or a current sensor, and is configured to detect working statuses of different components. In this embodiment, a unit management topology between the BMC management port and a component on the functional unit is established by using a self-discovery unit management topology mechanism, and a component on a corresponding functional unit may be directly accessed by using the unit management topology, thereby implementing extension of the BMC management port.

For example, using a BMC management port on an extension unit is extended as an example. In this embodiment, a baseboard management controller BMC is disposed on the extension unit, and extended topology information of each BMC management port on the extension unit is filled in FRUD information on the extension unit, where the extended topology information is for specifying an address of a component on each functional unit that can be directly accessed by the BMC. After the baseboard management controller BMC is powered on and started, the address of the component on the functional unit that can be accessed by each BMC management port may be obtained by reading the FRUD information on the extension unit, so as to establish layer-1 management topology information of an access address of the BMC and the component on each functional unit, and implement extension of the BMC management port based on the layer-1 management topology information. For example, generally, a correspondence between the BMC management port and the access address of the component on the functional unit is fixed in BMC management software. Therefore, one BMC management port can manage only one component on a corresponding functional unit. However, in this embodiment, a BMC management interface and the access address of the component on each functional unit are written in the FRUD information, instead of being fixed in the BMC management software. After reading the FRUD information, the BMC may establish layer-1 management topology information between the BMC management port and the component on each functional unit, where the layer-1 management topology information may specify a correspondence between any BMC management port and any component on any functional unit. In this way, a corresponding component on a specified functional unit may be accessed based on the correspondence, thereby implementing extension of the BMC management port. Herein, the layer-1 management topology refers to a topology formed by components that can be directly accessed by the BMC to a management interface of each functional unit. For example, a memory storing hardware self-description information needs to be located in the layer-1 management topology, so that the BMC may directly obtain hardware self-description information of the functional unit. Further, the hardware self-description information may describe a layer-2 or even layer-3 management interface extended inside the functional unit. For example, the management interface uses an $I^2C$ bus, and an $I^2C$ channel may be extended inside the functional unit through an $I^2C$ or a multiplexer (MUX). The extended $I^2C$ topology belongs to a layer-2 management topology.

In a specific embodiment, a temperature sensor, a current sensor, and a voltage sensor are disposed on a power unit, and the foregoing three sensors need to be controlled and managed. In this embodiment, the baseboard management controller BMC obtains layer-1 management topology information of the BMC management port on the extension unit and the temperature sensor, the current sensor, and the voltage sensor on the power unit by reading the FRUD information on the extension unit. Through the layer-1 management topology information, one BMC management port can access corresponding three sensors, namely, the temperature sensor, the current sensor, and the voltage sensor, and implement corresponding control and management.

2. Invalid Board Addition Management.

A computer or server manufacturer does not want users or other people to install a board that is not manufactured or specified by the manufacturer for a finished computer or server that the computer or server manufacturer sells. A board that is manufactured or specified by the manufacturer is referred to as a valid board, and a board that is not manufactured or specified by the manufacturer is referred to as an invalid board. An identifier (ID) may be set for the board to identify whether the board is the valid board or the invalid board. For example, the validity of the board may be determined through a serial number (SN) of the board or another information that uniquely identifies the board. When it is detected that an identifier of the newly connected board satisfies a numbering rule or another checking mode, the newly connected board may be determined as the valid card; and when it is detected that an identifier of the newly connected board does not satisfy the numbering rule or another checking mode, the newly connected board may be determined as the invalid board.

To effectively avoid invalid addition of the board, a limitation function may be further added in embodiments of this application. For example, but is not limited to: a quantity of boards is limited to an unreasonable increase, and a board provided by a non-compliant manufacturer is limited.

Specifically, an ID of the board is written in the FRUD information of the functional unit, and the BMC is provided with host device configuration information, including a configuration of the basic computing unit and a quantity of configured corresponding boards and an ID of a corresponding board.

After the board is connected to the motherboard, the baseboard management controller BMC reads FRUD information on a functional board, obtains an ID number of the board, and compares the ID number of the board obtained from the FRUD information with an ID number of the corresponding board in basic computing unit configuration information to determine whether the board is valid.

For the valid board, the baseboard management controller BMC reads hardware self-description information of the board, constructs a management object instance of the board, and completes self-adaptation on the board, so that the board can be used normally.

However, for the invalid board, the baseboard management controller BMC does not read the hardware self-description information of the board any more, and the management object instance of the board cannot be constructed, so that the board cannot be used.

To further improve universality, the ID number of the board in the host device configuration information on the BMC may be replaced with an ID number sequence range or a wildcard character, for example, A001-A100, or A1$. In this way, all boards in the ID number sequence are considered as valid boards.

Based on the foregoing solution, this application can further conveniently perform remote configuration and upgrade of the motherboard. For example, after the user purchases an upgrade service, for example, upgrading an expanded memory, a motherboard manufacturer may update motherboard configuration information on the basic computing unit through a network. In this way, after the user purchases an expanded memory card, the expanded memory card may be automatically identified and adapted to the basic computing unit or the extension unit for normal use.

3. Internal Ambient Temperature Management of a Customized Computing Device.

Most computing devices are generally provided with a plurality of heat dissipation apparatuses, such as a power radiator, a CPU radiator, a graphics card radiator, and a chassis radiator. Correspondingly, a plurality of temperature sensors are also disposed in the chassis to obtain a real-time temperature of a corresponding component. For some computing devices, different functional units have special requirements on the ambient temperature and heat dissipation due to customized configurations. Therefore, in embodiments of this application, the FRUD information on the functional unit is used to implement a management function of automatically adapting to different ambient temperatures.

Specifically, in the FRUD information on the functional unit, a detection value of a sensor in the computing device may be specified as an environment monitoring temperature of the functional unit, to satisfy a special heat dissipation requirement (for example, a special requirement of the ambient temperature). For example, for a functional unit such as a graphics card and a power that have a relatively high heat dissipation requirement, a temperature sensor corresponding to a position of a central processing unit may be designated in the FRUD information as a matching sensor for determining an ambient temperature of the functional unit, and heat dissipation management is provided in a targeted manner. However, for a functional unit such as a hard disk having a relatively low heat dissipation requirement, a temperature sensor near the memory may be used as a matching sensor for determining an ambient temperature of the functional unit, and heat dissipation control is provided in a targeted manner.

In this way, on one hand, heat dissipation management solutions of different functional units may be flexibly configured. In addition, there is no need to separately configure a temperature sensor for each functional unit that needs the heat dissipation management, thereby reducing a quantity of disposed temperature sensors and reducing costs.

4. Flexible Adaptation of a Unit Slot.

To facilitate management, according to a requirement of an entire device, each functional unit configured on the entire device needs to be mapped to a slot number or name of the entire device. Compared with a fixed slot relationship of a conventional server, the baseboard management controller BMC in this embodiment may write a slot number of the functional unit into the FRUD in the functional unit, and establish a management correspondence, thereby implementing redefinition of the slot number or a unit name of the functional unit, flexible adaptation, and easy management. In addition, the mapping between a physical slot on a panel of the entire device and the internal slot used by the actual unit is also implemented, to avoid that the name of the slot in which the functional unit is located needs to be mapped through software upgrade because of different types of entire devices.

In a possible embodiment, this application further provides a computing device. The computing device has the motherboard shown in FIG. 1 to FIG. 5. During specific application, the computing device may be the foregoing server, or may be an edge device (edge device) that includes the motherboard and provides an entry point for a core network of an enterprise or a service provider, for example, but is not limited to a router, a routing switch, an Integrated Access Device (IAD), a multiplexer, and various metropolitan area network (MAN) and wide area network (WAN) access devices. In addition, the computing device may also be a personal computer (PC).

This application further provides a baseboard management controller, including a processor and a main memory. The main memory stores program code. When the baseboard management controller runs, the processor is enabled to execute the program code to implement functions of operation steps of the method performed by the baseboard management controller in any one of the methods shown in FIG. 8 to FIG. 11. For brevity, details are not described herein again.

The computing device provided in embodiments of this application has beneficial effects of the motherboard provided in embodiments of this application. For details, refer to specific descriptions of the motherboard in the foregoing embodiments. Details are not described in embodiments of this application again.

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions. When the computer program instructions are loaded or executed on a computer, the procedures or functions based on embodiments of this application of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive (SSD).

It may be clearly understood by a person skilled in the art that, for the purpose of convenient and brief description, for a detailed working process of the foregoing system, apparatus, and unit, refer to a corresponding process in the foregoing method embodiments. Details are not described herein again.

What is claimed is:

1. A motherboard, comprising:

a first daughter board of the motherboard as a basic computing unit, provided with a basic component and a first external interface, wherein the basic component comprises a component in a minimum system that provides a general computing capability; and a plurality of second daughter boards of the motherboard as extension units, configured to implement functional expansion of the basic computing unit;

wherein the extension units are connected to respective extension components, and connected to the first external interface of the basic computing unit through their respective second external interfaces, such that the respective extension components are connected to the basic computing unit through their respective extension units, wherein each of the respective extension components includes at least one of an input/output (I/O) unit, a storage unit, an acceleration unit or a memory expansion unit; and wherein the extension units include a first extension unit and a second extension unit that are connected to different types of extension components.

2. The motherboard of claim 1, wherein the first external interface comprises a management interface and a data interface, wherein the management interface is configured to implement transmission of a control signal between the basic computing unit and one of the extension units; and the data interface is configured to implement data transmission between the basic component and the extension components.

3. The motherboard of claim 2, wherein the extension components are coupled to the data interface, to implement data transmission between the basic component and the extension components.

4. The motherboard of claim 2, wherein at least one of the extension components is disposed on the one of the extension units, and the one of the extension units is connected to the data interface, to implement data transmission between the basic component and the at least one of the extension components.

5. The motherboard of claim 2, wherein the first external interface further comprises a first power supply interface, wherein the first power supply interface is configured to supply power based on a power supply requirement of the basic component and/or at least one of the extension components.

6. The motherboard of claim 5, wherein the first power supply interface is connected to a power supply unit through a cable.

7. The motherboard of claim 1, wherein the basic computing unit is configured to have a plurality of board body sizes, and one board body size in the plurality of board body sizes is set based on a quantity of configured processors and/or a quantity of configured memories.

8. The motherboard of claim 7, wherein a mounting hole is provided on the basic computing unit, and the mounting hole adapts to a fixing structure on a chassis of the computing device.

9. The motherboard of claim 8, wherein the fixing structure is divided into at least one group of fixing structures based on a position relationship, and one group of fixing structures in the at least one group of fixing structures is adaptable to basic computing units of different board body sizes.

10. The motherboard of claim 1, wherein the second external interfaces comprise a second power supply interface, and when one of the extension units comprises a component whose power supply requirement is less than a first threshold, the second power supply interface is configured to be connected to the first power supply interface in an inter-board transfer power supply manner, to supply power to the component in the one of the extension units.

11. The motherboard of claim 1, wherein the second external interfaces comprise comprises a second power supply interface, and when the one of the extension units comprises a component whose power supply requirement is greater than or equal to a second threshold, the second power supply interface is directly connected to a power supply unit through a cable, to supply power to the component in the one of the extension units in a direct-connection power supply manner through the cable.

12. The motherboard of claim 1, wherein a management object template is preset in a baseboard management controller, and hardware self-description information corresponding to the management object template is preset in at least one of the extension components; and the baseboard management controller is configured to obtain the hardware self-description information of the at least one of the extension components, generate a management object instance based on the management object template and the hardware self-description information, and identify and perform monitoring and management on the at least one of the extension components through the management object instance, wherein the monitoring and management comprises at least one of temperature control or validity check.

13. The motherboard of claim 2, wherein the data interface comprises at least one of interfaces that support functions of a peripheral component interconnect express (PCIe), a compute express link (CXL), a unified bus (UB), a Huawei cache coherence system (HCCS), a serial attached small computer system (SAS), or a serial advanced technology attachment (SATA).

14. The motherboard of claim 1, wherein a baseboard management controller is disposed on one of the extension units.

15. The motherboard of claim 1, wherein the motherboard further comprises a third daughter board of the motherboard as an extension unit on which a baseboard management controller is disposed, the baseboard management controller comprises different types of management object templates including a first type of management object template corresponding to the basic computing unit and a second type of management object template corresponding to the second extension unit;

the baseboard management controller is configured to:

obtain first hardware self-description information from the first extension unit, generate a first management object instance based on the first type of management object template and the first hardware self-description information; and obtain second hardware self-description information of the at least one functional unit from the second extension unit, generate a second management object instance based on the second type of management object template and the second hardware self-description information.

16. The motherboard of claim 1, wherein the motherboard further comprises a baseboard management controller card connected to one of the extension units through a slot.

17. A computing device, comprising a motherboard, wherein the motherboard comprises:

a first daughter board of the motherboard as a basic computing unit, provided with a basic component and a first external interface, wherein the basic component comprises a component in a minimum system that provides a general computing capability; and a plurality of second daughter boards of the motherboard as extension units, configured to implement functional expansion of the basic computing unit wherein the extension units are connected to respective extension components, and connected to the first external interface of the basic computing unit through their respective second external interfaces, such that the respective extension components are connected to the basic computing unit through their respective extension units, wherein each of the respective extension components includes at least one of an input/output (I/O) unit, a storage unit, an acceleration unit or a memory expansion unit; and wherein the extension units include a first extension unit and a second extension unit that are connected to different types of extension components.

18. The computing device of claim 17, wherein the first external interface comprises a management interface and a data interface, wherein the management interface is configured to implement transmission of a control signal between the basic computing unit and one of the extension units; and the data interface is configured to implement data transmission between the basic component and the extension components.

* * * * *